(12) United States Patent
Asakawa

(10) Patent No.: US 12,084,586 B2
(45) Date of Patent: Sep. 10, 2024

(54) INK JET INK COMPOSITION AND RECORDING METHOD

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 117 days.

(21) Appl. No.: 17/980,932

(22) Filed: Nov. 4, 2022

(65) Prior Publication Data

US 2023/0141725 A1 May 11, 2023

(30) Foreign Application Priority Data

Nov. 5, 2021 (JP) .................................. 2021-181112

(51) Int. Cl.
*C09D 11/38* (2014.01)
*B41J 2/01* (2006.01)
(Continued)

(52) U.S. Cl.
CPC .................. *C09D 11/38* (2013.01); *B41J 2/01* (2013.01); *C08K 5/053* (2013.01); *C08K 5/06* (2013.01);
(Continued)

(58) Field of Classification Search
CPC .............. B41J 2/01; B41J 2/21; B41J 2/2107; C09D 11/322; C09D 11/38; C09D 11/108;
(Continued)

(56) References Cited

U.S. PATENT DOCUMENTS

2017/0291421 A1* 10/2017 Okuda ................. B41J 2/16552
2018/0072905 A1    3/2018 Tabuchi et al.
2018/0236783 A1*  8/2018 Matsuzaki ........... B41J 11/0015

FOREIGN PATENT DOCUMENTS

JP           2018-044074 A         3/2018

* cited by examiner

*Primary Examiner* — Jannelle M Lebron
(74) *Attorney, Agent, or Firm* — Harness, Dickey & Pierce, P.L.C.

(57) ABSTRACT

A water-based ink jet ink composition according to the present disclosure includes: a colorant; an amine; and a water-soluble low molecular weight organic compound and is used for recording on a non-absorbing recording medium or a low-absorbing recording medium. The water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9, a content of a water-soluble low molecular weight organic compound having a standard boiling point of 250° C. or less is 8 to 30 percent by mass with respect to a total mass of the ink composition, a water-soluble low molecular weight organic compound which is an alkane polyol having a standard boiling point of more than 250° C. is not contained at a content of more than 3 percent by mass with respect to the total mass of the ink composition, and a content of the amine with respect to the total mass of the ink composition is 5 percent by mass or less.

(1)

(Continued)

In the general formula (1), $R_1$ represents an alkylene group having 2 to 5 carbon atoms, $R_2$ represents an alkyl group having 1 or 2 carbon atoms, and n represents 1 or 2.

10 Claims, 1 Drawing Sheet

(51) Int. Cl.
    *C08K 5/053*     (2006.01)
    *C08K 5/06*     (2006.01)
    *C08K 5/17*     (2006.01)
    *C09D 11/108*     (2014.01)
    *C09D 11/32*     (2014.01)

(52) U.S. Cl.
    CPC .............. *C08K 5/17* (2013.01); *C09D 11/108* (2013.01); *C09D 11/32* (2013.01)

(58) Field of Classification Search
    CPC ......... C09D 11/32; C09D 11/10; C09D 11/40; C09D 11/54; C08K 5/053; C08K 5/06; C08K 5/17
    See application file for complete search history.

INK JET INK COMPOSITION AND RECORDING METHOD

The present application is based on, and claims priority from JP Application Serial Number 2021-181112, filed Nov. 5, 2021, the disclosure of which is hereby incorporated by reference herein in its entirety.

BACKGROUND

1. Technical Field

The present disclosure relates to an ink jet ink composition and a recording method.

2. Related Art

There has been known an ink jet recording method in which an image is recorded on a recording medium by ejecting fine ink droplets from nozzles of an ink jet head of an ink jet recording apparatus. In recent years, besides image recording performed on a recording medium, such as regular paper, having an excellent ink absorbency, the ink jet recording method has become to be used for image recording on a low-absorbing recording medium, such as art paper or coated paper, having a low ink absorbency or a non-absorbing recording medium, such as a plastic film, hardly absorbing an ink. In addition, even for image recording on the low-absorbing recording medium or the non-absorbing recording medium as described above, a water-based ink jet ink composition (hereinafter, referred to as "water-based ink" or "ink composition" in some cases) using water as a primary component has become to be used.

When the recording is performed on the low-absorbing recording medium or the non-absorbing recording medium as described above, and in particular, is performed on a plastic film, the water-based ink is not likely to wet-spread on the recording medium, and as a result, an image quality (wet spreadability) is disadvantageously liable to be degraded such that a color development property of a recorded matter cannot be sufficiently obtained.

JP-A-2018-44074 has disclosed a water-based ink jet ink composition containing a glycol monoether solvent (3-methoxy-1-butanol).

When the specific solvent as described above is contained in the ink, since the solvent as described above has a high drying property, clogging is liable to occur in an ink jet head, and as a result, a clogging recovery property is inferior. In addition, the solvent described above has characteristics to degrade a dispersion stability of an ink component present in a dispersion form, and as a result, a storage stability of the ink is also inferior.

As described above, an ink jet ink composition excellent in image quality (wet spreadability), abrasion resistance, clogging recovery property, and storage stability could not be obtained in the past.

SUMMARY

According to an aspect of the present disclosure, there is provided a water-based ink jet ink composition which comprises: a colorant; an amine; and a water-soluble low molecular weight organic compound and which is used for recording on a non-absorbing recording medium or a low-absorbing recording medium. In the ink jet ink composition described above, the water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9, a content of a water-soluble low molecular weight organic compound having a standard boiling point of 250° C. or less is 8 to 30 percent by mass with respect to a total mass of the ink composition, a water-soluble low molecular weight organic compound which is an alkane polyol having a standard boiling point of more than 250° C. is not contained at a content of more than 3 percent by mass with respect to the total mass of the ink composition, and a content of the amine with respect to the total mass of the ink composition is 5 percent by mass or less.

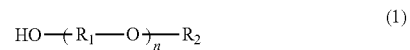

$$HO \!-\!\!\!\left(R_1 \!-\!\! O\right)_{\!\!n}\!\!-\! R_2 \quad (1)$$

In the general formula (1), $R_1$ represents an alkylene group having 2 to 5 carbon atoms, $R_2$ represents an alkyl group having 1 or 2 carbon atoms, and n represents 1 or 2.

According to another aspect of the present disclosure, there is provided a recording method comprising: an adhesion step of adhering the ink jet ink composition according to the above aspect to the non-absorbing recording medium or the low-absorbing recording medium by an ink jet method.

DESCRIPTION OF EXEMPLARY EMBODIMENTS

Figure 1:
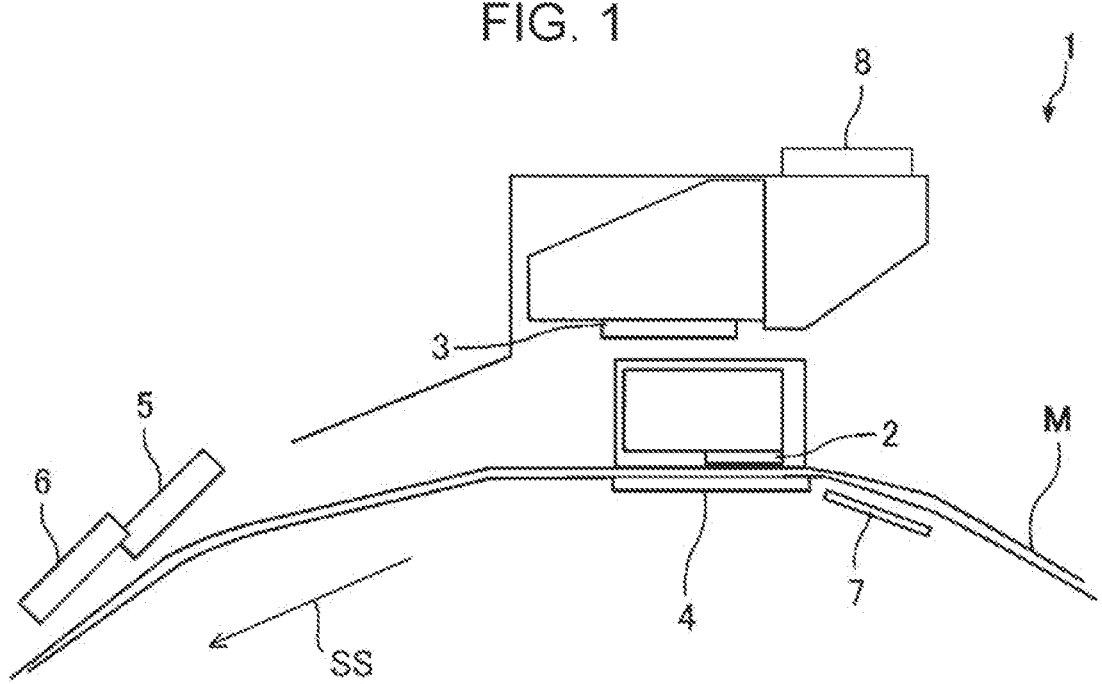
FIG. 1 is a schematic view of an example of an ink jet recording apparatus.

Hereinafter, embodiments of the present disclosure will be described. The following embodiments are described to explain examples of the present disclosure. The present disclosure is not at all limited to the following embodiments and includes various types of changed and/or modified embodiments to be performed without departing from the scope of the present disclosure. In addition, all the structures described below are not always required to be essential structures.

1. Ink Jet Ink Composition

An ink jet ink composition according to one embodiment of the present disclosure is a water-based ink jet ink composition which includes a colorant, an amine, and a water-soluble low molecular weight organic compound and which is used for recording on a non-absorbing recording medium or a low-absorbing recording medium. The water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9, a content of a water-soluble low molecular weight organic compound having a standard boiling point of 250° C. or less is 8 to 30 percent by mass with respect to a total mass of the ink composition, a water-soluble low molecular weight organic compound compound which is an alkane polyol having a standard boiling point of more than 250° C. is not contained at a content of more than 3 percent by mass with respect to the total mass of the ink composition, and a content of the amine with respect to the total mass of the ink composition is 5 percent by mass or less.

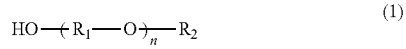

$$HO-(R_1-O)_n-R_2 \quad (1)$$

In the general formula (1), $R_1$ represents an alkylene group having 2 to 5 carbon atoms, $R_2$ represents an alkyl group having 1 or 2 carbon atoms, and n represents 1 or 2.

When the recording is performed on the low-absorbing recording medium or the non-absorbing recording medium, and in particular, is performed on a plastic film, a water-based ink is not likely to wet-spread on the recording medium, and as a result, an image quality (wet spreadability) is disadvantageously liable to be degraded such that a color development property of a recorded matter cannot be sufficiently obtained.

In recent days, it was found that when a specific alkylene glycol monoether is contained in a water-based ink, the wet spreadability thereof on a low-absorbing recording medium or a non-absorbing recording medium can be improved.

However, since the specific alkylene glycol monoether as described above has a high drying property, clogging is liable to occur in an ink jet head, and hence, a clogging recovery property is inferior. In addition, the specific alkylene glycol monoether has characteristics to degrade a dispersion stability of an ink component, such as a colorant, present in a dispersion form, and hence, a storage stability of the ink is also inferior.

On the other hand, in order to secure the clogging recovery property, when the ink composition is prepared so as to have an unnecessarily low drying property, the drying property thereof is degraded, and an abrasion resistance of the recorded matter is degraded. As a result, it was difficult to prepare a composition which secures the drying property and the abrasion resistance with good balance.

For example, when the clogging recovery property is tried to be secured using an organic solvent having a low drying property (that is, an organic solvent having a high moisture retaining property) in combination, the abrasion resistance tends to be degraded, and hence, those two types of properties are difficult to obtain with good balance.

In addition, when a total content of the organic solvents is unnecessarily increased, in general, the drying property is liable to be inferior, and the abrasion resistance is also liable to be degraded. Hence, the total content of the organic solvents in the ink is required to be set in a predetermined range or lower than that. By the ink composition in which the total content of the organic solvents is required to be set in a predetermined range or lower than that as described above, in the past, the clogging recovery property and the abrasion resistance were difficult to obtain at the same time.

In addition, since some high boiling point solvents, such as glycerin, are superior in moisture retaining property but inferior in drying property, the use thereof is preferably avoided.

In addition, as a compound which is excellent in clogging recovery property and moisture retaining property and which is also relatively excellent in abrasion resistance since the drying property is not likely to be degraded, a specific alkanediol, such as propylene glycol, may be mentioned. In addition, since the specific alkanediol is also not likely to degrade the dispersion stability of the ink component, such as the colorant, present in a dispersion form, the storage stability of the ink is also made excellent.

The specific alkanediol as described above was contained together with the specific alkylene glycol monoether described above at a specific ratio, and research to obtain the storage stability and the like was performed. However, the clogging recovery property and the abrasion resistance still could not be obtained at the same time.

Accordingly, through intensive research carried out by the present inventor, it was found that when an amine is also used in combination, excellent abrasion resistance and clogging recovery property can be obtained at the same time. The amine is superior in moisture retaining property, and even by the use of a small amount of the amine, the clogging recovery property can be made excellent. In addition, the degradation in drying property is relatively not likely to occur. Although the reason for this is not clearly understood, it is believed that since the amine is likely to be evaporated by secondary drying performed to complete the drying of the recorded matter, the abrasion resistance is also made excellent.

As described above, according to the ink jet ink composition of this embodiment, since the specific alkylene glycol monoether, the specific alkanediol, and the amine are used in combination, while an excellent image quality (wet spreadability) is obtained, excellent abrasion resistance, clogging recovery property, and storage stability can be obtained.

Hereinafter, individual components contained in the ink jet ink composition according to this embodiment will be described.

1.1. Colorant

The ink jet ink composition according to this embodiment contains a colorant.

As the colorant, both a pigment and a dye may be used, and for example, an inorganic pigment, such as carbon black or titanium white, an organic pigment, an oil soluble dye, an acidic dye, a direct dye, a reactive dye, a basic dye, a dispersive dye, or a sublimation dye may be used. The ink composition described above preferably contains a pigment, and the pigment may be dispersed by a dispersion resin. In addition, it should be noted that the colorant is not included in the water-soluble low molecular weight organic compound which will be described later.

Pigment

As the inorganic pigment, for example, a carbon black (C.I. Pigment Black 7), such as a furnace black, a lamp black, an acetylene black, or a channel black, an iron oxide, a titanium oxide, a zinc oxide, or a silica may be used.

As the organic pigment, for example, there may be mentioned a quinacridone-based pigment, a quinacridone-quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

As a concrete example of the organic pigment used in the ink composition described above, for example, the following may be mentioned.

As a cyan pigment, for example, C.I. Pigment Blue 1, 2, 3, 15:3, 15:4, 15:34, 16, 22, or 60; or C.I. Vat Blue 4 or 60 may be mentioned, and for example, one selected from the group consisting of C.I. Pigment Blue 15:3, 15:4, and 60 or a mixture containing at least two types thereof may be preferably mentioned.

As a magenta pigment, for example, C.I. Pigment Red 5, 7, 12, 48(Ca), 48(Mn), 57(Ca), 57:1, 112, 122, 123, 168, 184, 202, or 209 or C.I. Pigment Violet 19 may be mentioned, and for example, one selected from the group consisting of C.I. Pigment Red 122, 202, and 209, and C.I. Pigment Violet 19 or a mixture containing at least two types thereof may be preferably mentioned.

As a yellow pigment, for example, C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, or 185 may be mentioned, and for example, one selected from the group consisting of C.I. Pigment Yellow 74, 109, 110, 128, 138, 150, and 180 or a mixture containing at least two types thereof may be preferably mentioned.

At least one pigment other than those mentioned above may also be used. For example, an orange pigment and/or a green pigment may be mentioned.

The pigments mentioned above by way of example are examples of preferable pigments, and the present disclosure is not limited thereto. One of those pigments may be used alone, or at least two types thereof may be used as a mixture, and those pigments each may be used with a dye in combination.

In addition, the pigment may be used after being dispersed using a dispersant selected from a water-soluble resin, a surfactant, and the like or may be used after being dispersed as a self-dispersible pigment by oxidizing or sulfonizing a pigment surface using ozone, hypochlorous acid, fuming sulfuric acid, or the like. In addition, as the surfactant which may be used as the dispersant, a surfactant which may be contained in the ink composition described below may also be used.

In the water-soluble resin which may be used as the dispersant, for example, a resin polymerized using a hydrophilic group-containing monomer and a hydrophobic group-containing monomer may be preferably used.

The water-soluble resin which may be used as the dispersant can be obtained using a known polymer preparation method.

In addition, the pigment may be dispersed as a resin-coated pigment which is coated with a resin. The resin-coated pigment is dispersible in a water-based medium in the form of a pigment coated or enclosed with a high molecular weight compound, and a pigment dispersion liquid has a water phase in which the resin-coated pigment is dispersed.

The resin-coated pigment is formed by a known physical/mechanical method or chemical method. In particular, for example, a phase separation method (coacervation), a liquid drying method (interface precipitation method), a spray drying method, a pan coating method, a liquid curing coating method, an interface polymerization method, an in-situ method, or an ultrasonic method may be used without any particular restriction.

For example, when a monomer of the water-soluble resin is polymerized by emulsion polymerization or the like under the presence of the pigment, the resin-coated pigment can be obtained.

In addition, as a preferable manufacturing method of the resin-coated pigment, a phase inversion emulsification method may be mentioned.

Dye

In the ink jet ink composition according to this embodiment, as the colorant, a dye may also be used. The dye is not particularly limited, and for example, an acidic dye, a direct dye, a reactive dye, a basic dye, or a dispersive dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 132, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, 141, or 249, or C.I. Reactive Black 3, 4, or 35.

Although a content of the colorant may be appropriately adjusted in accordance with application, the content described above with respect to the total mass of the ink composition is preferably 0.1 to 17.0 percent by mass, more preferably 0.2 to 15.0 percent by mass, further preferably 1.0 to 10.0 percent by mass, and particularly preferably 2.0 to 5.0 percent by mass.

A volume average particle diameter of pigment particles when the pigment is used as the colorant is preferably 10 to 200 nm, more preferably 30 to 200 nm, further preferably 50 to 150 nm, and particularly preferably 70 to 120 nm.

1.2. Amine

The ink jet ink composition according to this embodiment contains an amine. As the amine, for example, an aliphatic amine, an aromatic amine, or a heterocyclic amine may be mentioned. In the ink composition described above, among the amines, an aliphatic amine is preferable, and in particular, an alkanolamine which is a compound having a hydroxy group and an amine group in its alkane skeleton is more preferable. In addition, it should be noted that the amine is not included in the water-soluble low molecular weight organic compound which will be described later.

As the alkanolamine, for example, there may be mentioned ethanolamine (standard boiling point: 170° C., phase at 25° C.: liquid), N-methylethanolamine (standard boiling point: 156° C., phase at 25° C.: liquid), N,N-dimethylethanolamine (standard boiling point: 134° C., phase at 25° C.: liquid), N-ethylethanolamine (standard boiling point: 169° C., phase at 25° C.: liquid), N,N-diethylethanolamine (standard boiling point: 162° C., phase at 25° C.: liquid), N-butylethanolamine (standard boiling point: 199° C., phase at 25° C.: liquid), N,N-dibutylethanolamine (standard boiling point: 226° C., phase at 25° C.: liquid), N-tert-butylethanolamine (standard boiling point: 177° C., phase at 25° C.: solid [melting point: 44° C.]), diethanolamine (standard boiling point: 268° C., phase at 25° C.: solid [melting point: 28° C.]), N-methyldiethanolamine (abbreviation: MDEA, standard boiling point: 245° C., phase at 25° C.: liquid), N-ethyldiethanolamine (standard boiling point: 251° C., phase at 25° C.: liquid), N-butyldiethanolamine (standard boiling point: 275° C., phase at 25° C.: liquid), N-tert-butyldiethanolamine (abbreviation: tBDEA, standard boiling point: 271° C., phase at 25° C.: solid [melting point: 49° C.]), triethanolamine (abbreviation: TEA, standard boiling point: 335° C., phase at 25° C.: liquid), isopropanolamine (standard boiling point: 159° C., phase at 25° C.: liquid), N,N-dimethylisopropanolamine (standard boiling point: 125° C., phase at 25° C.: liquid), N,N-diethylisopropanolamine (standard boiling point: 159° C., phase at 25° C.: liquid), diisopropanolamine (abbreviation: DIPA, standard boiling point: 249° C., phase at 25° C.: solid, [melting point: 44° C.]), triisopropanolamine (abbreviation: TIPA, standard boiling point: 301° C., phase at 25° C.: solid, [melting point: 45° C.]), propanolamine (standard boiling point: 188° C., phase at 25° C.: liquid), N,N-dimethylpropanolamine (standard boiling point: 164° C., phase at 25° C.: liquid), 2-amino-1-propanol (alias: alaninol, standard boiling point: 175° C., phase at 25° C.: liquid), 2-amino-2-methyl-1-propanol (abbreviation: AMP, standard boiling point: 165° C., phase at 25° C.: liquid), 2-dimethylamino-2-methyl-1-propanol (standard boiling point: 156° C., phase at 25° C.: liquid), 5-amino-1-pentanol (standard boiling point: 222° C., phase at 25° C.: solid, [melting point: 36° C.]), 3-amino-1,2-propanediol (standard boiling point: 249° C., phase at 25° C.: liquid), 3-methylamino-1,2-propanediol (standard boiling point: 247° C., phase at 25° C.: solid, [melting point: 69° C.]), 2-amino-1,3-propanediol (alias: serinol, standard boiling point: 274° C., phase at 25° C.: solid, [melting point: 52° C.]), 2-amino-2-hydroxymethyl-1,3-propanediol (abbreviation: THAM, alias: trishydroxymethylaminomethane, standard boiling point: 288° C., phase at 25° C.: solid, [melting point: 170° C.]), 2-amino-2-methyl-1,3-propanediol (standard boiling point: 260° C., phase at 25° C.: solid, [melting point: 108° C.]), or 2-amino-2-ethyl-1,3-propanediol (standard boiling point: 259° C., phase at 25° C.: solid, [melting point: 34° C.]).

Among the alkanolamines mentioned above, at least one selected from N-methyldiethanolamine, N-tert-butyldiethanolamine, triethanolamine, diisopropanolamine, triisopropanolamine, 2-amino-2-methyl-1-propanol, and 2-amino-2-hydroxymethyl-1,3-propanediol is preferable, and in particular, at least one selected from N-tert-butyldiethanolamine, triethanolamine, triisopropanolamine, and 2-amino-2-hydroxymethyl-1,3-propanediol is more preferable. When the alkanolamine is selected from those mentioned above, the clogging recovery property tends to be made more excellent.

As amines other than the alkanolamines mentioned above, for example, there may be mentioned morpholine (standard boiling point: 129° C., phase at 25° C.: liquid), N-methylmorpholine (standard boiling point: 116° C., phase at 25° C.: liquid), N-ethylmorpholine (standard boiling point: 139° C., phase at 25° C.: liquid), N-(3-aminopropyl)morpholine (abbreviation: APM, standard boiling point: 225° C., phase at 25° C.: liquid), N,N-dimethylpiperazine (standard boiling point: 133° C., phase at 25° C.: liquid), or 1-(2-hydroxyethyl)piperazine (standard boiling point: 246° C., phase at 25° C.: liquid).

A lower limit of the standard boiling point of the amine is preferably 150° C. or more, more preferably 180° C. or more, even more preferably 210° C. or more, further preferably 240° C. or more, even further preferably 270° C. or more, and particularly preferably 300° C. or more. In addition, Although not particularly limited, an upper limit of the standard boiling point of the amine is preferably 350° C. or less, more preferably 320° C. or less, even more preferably 290° C. or less, further preferably 260° C. or less, and even further preferably 230° C. or less.

As for the standard boiling point of the amine mentioned above, the amine is more preferably an alkanolamine. That is, a lower limit of the standard boiling point of the alkanolamine is preferably 150° C. or more, more preferably 180° C. or more, even more preferably 210° C. or more, further preferably 240° C. or more, even further preferably 270° C. or more, and particularly preferably 300° C. or more. In addition, although not particularly limited, an upper limit of the standard boiling point of the alkanolamine is preferably 350° C. or less, more preferably 320° C. or less, even more preferably 290° C. or less, further preferably 260° C. or less, and even further preferably 230° C. or less.

When the amine is an alkanolamine having a standard boiling point in the range described above or is preferably an alkanolamine having a standard boiling point of 270° C. or more, the moisture retaining property is made more excellent, and in addition, a preferable drying property tends to be secured. Hence, the clogging recovery property and the abrasion resistance tend to be made preferable with good balance.

In the ink jet ink composition according to this embodiment, a content of the amine with respect to the total mass of the ink composition is 5.0 percent by mass or less. The content of the amine with respect to the total mass of the ink composition is more preferably 4.0 percent by mass or less, even more preferably 3.0 percent by mass or less, further preferably 2.0 percent by mass or less, and particularly preferably 1.0 percent by mass or less. In addition, although not particularly limited, a lower limit of the content of the amine is preferably 0.1 percent by mass or more, more preferably 0.3 percent by mass or more, even more preferably 0.5 percent by mass or more, further preferably 1.0 percent by mass or more, even further preferably 1.5 percent by mass or more, particularly preferably 2.0 percent by mass or more, and more particularly preferably 3.0 percent by mass or more.

When the content of the amine with respect to the total mass of the ink composition is 5.0 percent by mass or less, an excellent moisture retaining property is not only obtained, but a preferable drying property can also be secured, so that excellent clogging recovery property and abrasion resistance can be obtained at the same time. In addition, when the content of the amine is in the range described above, the clogging recovery property and the abrasion resistance tend to be made more excellent at the same time.

In addition, since having a basic property, the amine may also be used as a pH adjuster or the like in some cases. In the present disclosure, the amine may also be used as a pH adjuster or as another purpose. That is, in the present disclosure, it should be noted that the purpose to contain the amine is not restricted.

1.3. Water-Soluble Low Molecular Weight Organic Compound

The ink jet ink composition according to this embodiment is a composition which contains at least one water-soluble low molecular weight organic compound. In this embodiment, the "water-soluble" in the water-soluble low molecular weight organic compound indicates a solubility of more than 10 g per 100 g of water at 20° C. In addition, the "low molecular weight" indicates a molecular weight of 300 or less, more preferably 30 to 250, even more preferably 50 to 200, and further preferably 70 to 150. In addition, it should be noted that the colorant and the amine described above are not included in the water-soluble low molecular weight organic compound.

The water-soluble low molecular weight organic compound may be a water-soluble organic solvent but is not limited thereto.

1.3.1. Type of Water-Soluble Low Molecular Weight Organic Compound

As the water-soluble low molecular weight organic compound, for example, although an alcohol, an alkanediol, an alkane polyol, an alkylene glycol ether, an ester, an amide, a sulfur-containing solvent, or a cyclic ether may be mentioned, the water-soluble low molecular weight organic compound is not limited thereto.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is one or more and is preferably two or more. The alkane may be either linear or branched. As the alcohol, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

As the alkanediol, for example, a compound in which an alkane is replaced by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol (alias: isoprene glycol), 3-methyl-1,5-pentanediol, 2-ethyl-1,3-hexanediol, 3-methyl-1,5-pentanediol, 2-methylpentane-2,4-diol (alias: hexylene glycol), 1,6-hexanediol, 2-ethyl-2-methyl-1,3-propanediol, 2-methyl-2-propyl-1,3-propanediol, neopentyl glycol (alias: 2,2-dimethyl-1,3-propanediol), or pinacol (alias: 2,3-dimethyl-2,3-butanediol).

As the alkane polyol, for example, an alkanediol, a condensate in which at least two alkanediol molecules are intermolecular condensed between hydroxy groups, or an alkane having at least three hydroxy groups may be mentioned. The alkanediol mentioned above is also included in the alkane polyol.

As the condensate in which at least two alkanediol molecules are intermolecular condensed between hydroxy groups, for example, there may be mentioned a dialkylene glycol, such as diethylene glycol or dipropylene glycol, or a trialkylene glycol, such as triethylene glycol or tripropylene glycol, may be mentioned.

The alkane having at least three hydroxy groups is a compound which has at least three hydroxy groups and a skeleton of an alkane, a polyol having a polyether structure, or the like. A compound in which an alkane or a polyol having a polyether structure is replaced by at least three hydroxy groups may be mentioned.

As the alkane having at least three hydroxy groups, for example, there may be mentioned glycerin, trimethylolethane, trimethylolpropane, 1,2,5-hexanetriol, 1,2,6-hexanetriol, pentaerythritol, or a polyoxypropylene triol.

As the alkylene glycol ether, for example, a compound in which at least one hydroxy group of the alkane polyol mentioned above is etherified may be mentioned. For example, an alkylene glycol monoether in which one hydroxy group is etherified or an alkylene glycol diether in which two hydroxy groups are etherified may be mentioned. An alkylene glycol monoether is more preferable.

By the etherification, for example, an alkyl ether or an aryl ether may be formed, and an alkyl ether is preferably formed. The number of carbon atoms of an ether portion formed by the etherification is preferably 1 to 8 and more preferably 1 to 4. The number of carbon atoms of an alkylene glycol portion of the alkylene glycol ether is preferably 2 to 6. The number of repetitions of the alkylene glycol portion is preferably 1 to 5.

As a concrete example, for example, there may be mentioned an alkylene glycol monoether, such as 2-methoxyethanol (alias: ethylene glycol monomethyl ether), 2-ethoxyethanol (alias: ethylene glycol monoethyl ether), ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, 1-methoxy-2-propanol (alias: propylene glycol-1-monomethyl ether), 2-methoxypropanol (alias: propylene glycol-2-monomethyl ether), 1-ethoxy-2-propanol (alias: propylene glycol monoethyl ether), propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, 3-methoxy-1-propanol (alias: 1,3-propanediol monomethyl ether), 1-methoxy-2-butanol (alias: 1,2-butanediol-1-monomethyl ether), 2-methoxy-1-butanol, 3-methoxy-1-butanol (alias: 1,3-butanediol-3-monomethyl ether), 4-methoxy-1-butanol (alias: 1,4-butanediol monomethyl ether), or 3-methoxy-3-methyl-1-butanol; or alkylene glycol diether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

As the ester, for example, an acyclic ester or a cyclic ester may be mentioned.

As the acyclic ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone; or a compound in which a hydrogen atom of a methylene group adjacent to a carbonyl group of one of those mentioned above is replaced by an alkyl group having 1 to 4 carbon atoms.

As the amide, for example, a cyclic amide or an acyclic amide may be mentioned. As the acyclic amide, for example, an alkoxyalkylamide may be mentioned.

As the cyclic amide, a lactam may be mentioned, and for example, there may be mentioned a pyrrolidone, such as 2-pyrrolidone (standard boiling point: 245° C.), 1-methyl-2-pyrrolidone, 1-ethyl-2-pyrrolidone, 1-propyl-2-pyrrolidone, or 1-butyl-2-pyrrolidone; 2-piperidone, ε-caprolactam, N-methyl-ε-caprolactam, N-cyclohexyl-2-pyrrolidone, 5-methyl-2-pyrrolidone, β-propiolactam, ω-heptalactam, or succinimide. Among those mentioned above, in particular, 2-pyrrolidone or ε-caprolactam is more preferable.

As the acyclic amide, for example, there may be mentioned an alkoxyalkylamide, such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-prooxy-N,N-methylethylpropionamide, 3-iso-propoxy-N,N-dimethylpropionamide, 3-iso-propoxy-N,N-diethylpropionamide, 3-iso-prooxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide; N,N-dimethylacetoacetamide, N,N-diethylacetoacetamide, N-methylacetoacetamide, N,N-dimethylisobutyramide, N,N-dimethylformamide, N,N-diethylformamide, N,N-dimethylacetamide, N,N-diethylacetamide, or N,N-dimethylpropionamide.

As the sulfur-containing solvent, for example, there may be mentioned a sulfoxide or a sulfone. As the sulfoxide, for example, there may be mentioned an acyclic sulfoxide, such as dimethyl sulfoxide or diethyl sulfoxide; or a cyclic sulfoxide, such as tetramethylene sulfoxide. As the sulfone, for example, there may be mentioned a cyclic sulfone, such as 3-methylsulfolane or sulfolane; or an acyclic sulfone, such as ethyl isopropyl sulfone, ethyl methyl sulfone, or dimethyl sulfone.

As the cyclic ether, for example, there may be mentioned tetrahydrofuran, 1,4-dioxane, dimethylisosorbide, 3-methyl-3-oxetanemethanol, 3-ethyl-3-oxetanemethanol, 2-hydroxymethyloxetane, tetrahydrofurfuryl alcohol, glycerol formal, solketal, 1,4-dioxane-2,3-diol, or dihydrolevoglucosenone.

At least two of those water-soluble low molecular weight organic compounds may be used in combination by mixing.

The standard boiling point of the water-soluble low molecular weight organic compound is preferably 300° C. or less, more preferably 270° C. or less, even more preferably 250° C. or less, further preferably 210° C. or less, and particularly preferably 190° C. or less. In addition, although a lower limit of the standard boiling point of the water-soluble low molecular weight organic compound is not particularly limited, the lower limit described above is preferably 100° C. or more, more preferably 110° C. or more, even more preferably 120° C. or more, and further preferably 150° C. or more.

A lower limit of the content of the water-soluble low molecular weight organic compound with respect to the total mass of the ink composition is preferably 8 percent by mass or more, more preferably 12 percent by mass or more, even more preferably 16 percent by mass or more, and further preferably 20 percent by mass or more. In addition, an upper limit of the content of the water-soluble low molecular weight organic compound with respect to the total mass of the ink composition is preferably 40 percent by mass or less, more preferably 35 percent by mass or less, even more preferably 30 percent by mass or less, and further preferably 25 percent by mass or less.

1.3.2. Specific Water-Soluble Low Molecular Weight Organic Compound (1)

In the ink jet ink composition according to this embodiment, the water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9.

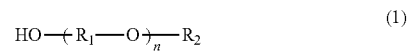

$$HO-(R_1-O)_n-R_2 \qquad (1)$$

In the general formula (1), $R_1$ represents an alkylene group having 2 to 5 carbon atoms, $R_2$ represents an alkyl group having 1 or 2 carbon atoms, and n represents 1 or 2.

In the general formula (1), $R_1$ may represent a linear or branched alkylene group having 2 to 5 carbon atoms. In addition, more preferably, $R_1$ may represent an alkylene group having 3 to 4 carbon atoms, $R_2$ may represent an alkyl group having 1 carbon atom, and n may represent 1.

A lower limit of the mass ratio (B/A) described above is preferably 0.22 or more and more preferably 0.25 or more. In addition, an upper limit of the mass ratio described above is preferably 0.8 or less, more preferably 0.7 or less, even more preferably 0.6 or less, further preferably 0.5 or less, even further preferably 0.4 or less, and particularly preferably 0.3 or less.

When the mass ratio (B/A) is 0.2 to 0.9 and is preferably in the range described above, the clogging recovery property, the abrasion resistance, and the storage stability tend to be made preferable with good balance.

Alkanediol (A)

An alkanediol having a standard boiling point of 210° C. or less is called the alkanediol (A). The alkanediol (A) is one of the alkanediols described above.

As the alkanediol (A), for example, there may be mentioned ethylene glycol (alias: ethane-1,2-diol, standard boiling point: 196° C., phase at 25° C.: liquid, number of carbon atoms (hereinafter, represented by "C"): 2), propylene glycol (abbreviation: PG, alias: propane-1,2-diol, standard boiling point: 188° C., phase at 25° C.: liquid, C3), 1,2-butanediol (standard boiling point: 194° C., phase at 25° C.: liquid, C4), 1,3-butylene glycol (abbreviation: 1,3BG, alias: 1,3-butanediol, standard boiling point: 207° C., phase at 25° C.: liquid, C4), 2,3-butanediol (standard boiling point: 182° C., phase at 25° C.: liquid, C4), 1,2-pentanediol (standard boiling point: 210° C., phase at 25° C.: liquid, C5), 2,4-pentanediol (standard boiling point: 198° C., phase at 25° C.: liquid, C5), 3-methyl-1,3-butanediol (alias: isoprene glycol, standard boiling point: 203° C., phase at 25° C.: liquid, C5), neopentyl glycol (alias: 2,2-dimethyl-1,3-propanediol, standard boiling point: 210° C., phase at 25° C.: solid [melting point: 128° C.], C5), 2-methylpentane-2,4-diol (alias: hexylene glycol, standard boiling point: 197° C., phase at 25° C.: liquid, C6), or pinacol (alias: 2,3-dimethyl-2,3-butanediol, standard boiling point: 174° C., phase at 25° C.: solid [melting point: 43° C.], C6).

Among the alkanediols (A) described above, at least one selected from propylene glycol, 2,3-butanediol, 1,2-butanediol, 1,3-butylene glycol, 3-methyl-1,3-butanediol, and 2-methylpentane-2,4-diol is preferable, and propylene glycol or 2,3-butandiol is more preferable.

The number of carbon atoms of the alkanediol (A) is preferably 7 or less and more preferably 2 to 6.

A content of the alkanediol (A) having a standard boiling point of 210° C. or less with respect to the total mass of the ink composition is preferably 10 to 25 percent by mass. A lower limit of the content described above is more preferably 11 percent by mass or more, more preferably 12 percent by mass or more, even more preferably 13 percent by mass or more, and further preferably 14 percent by mass or more. An upper limit of the content described above is preferably 23 percent by mass or less, more preferably 21 percent by mass or less, further preferably 19 percent by mass or less, and particularly preferably 17 percent by mass or less.

When the lower limit of the content of the alkanediol (A) described above is 10 percent by mass or more and more preferably the specific value described above or more, the moisture retaining property is made more excellent, and the clogging recovery property tends to be further improved. In addition, the dispersion stability tends to be not likely to be degraded, and the storage stability is likely to be made more preferable. In addition, when the upper limit of the content of the alkanediol (A) described above is 25 percent by mass or less and more preferably the specific value described above or less, since the drying property is likely to be secured, the abrasion resistance tends to be made more excellent.

The standard boiling point of the alkanediol (A) is preferably 150° C. to 210° C., more preferably 160° C. to 200° C., and further preferably 170° C. to 190° C.

Alkylene Glycol Monoether (B)

An alkylene glycol monoether represented by the general formula (1) having a standard boiling point of 210° C. or less is called the alkylene glycol monoether (B). The alkylene glycol monoether (B) is one of the alkylene glycol ethers described above.

As the alkylene glycol monoether (B), for example, there may be mentioned 2-methoxyethanol (alias: ethylene glycol monomethyl ether, standard boiling point: 124° C., phase at 25° C.: liquid, $R_1$=number of carbon atoms (hereinafter, represented by "C") 2; $R_2$=C1; n=1); 2-ethoxyethanol (alias: ethylene glycol monoethyl ether, standard boiling point: 136° C., phase at 25° C.: liquid, $R_1$=C2; $R_2$=C2; n=1); 1-methoxy-2-propanol (abbreviation: PM, alias: propylene glycol-1-monomethyl ether, standard boiling point: 120° C., phase at 25° C.: liquid, $R_1$=C3; $R_2$=C1; n=1); 1-ethoxy-2-propanol (abbreviation: PE, alias: propylene glycol monoethyl ether, standard boiling point: 132° C., phase at 25° C.: liquid, $R_1$=C3; $R_2$=C2; n=1); 2-methoxypropanol (alias: propylene glycol-2-monomethyl ether, standard boiling point: 102° C., phase at 25° C.: liquid, $R_1$=C3; $R_2$=C1; n=1); 3-methoxy-2-propanol (alias: 1,3-propandediol monomethyl ether, standard boiling point: 153° C., phase at 25° C.: liquid, $R_1$=C3; $R_2$=C1; n=1); 1-methoxy-2-butanol (alias: 1,2-butanediol monomethyl ether, standard boiling point: 135° C., phase at 25° C.: liquid, $R_1$=C4; $R_2$=C1; n=1); 2-methoxy-1-butanol (standard boiling point: 146° C., phase at 25° C.: liquid, $R_1$=C4; $R_2$=C1; n=1); 3-methoxy-1-butanol (abbreviation: MB, alias: 1,3-butanediol-3-monomethyl ether, standard boiling point: 158° C., phase at 25° C.: liquid, $R_1$=C4; $R_2$=C1; n=1); 4-methoxy-1-butanol (alias: 1,4-butanediol monomethyl ether, standard boiling point: 165° C., phase at 25° C.: liquid, $R_1$=C4; $R_2$=C1; n=1); 3-methoxy-3-methyl-1-butanol (abbreviation: MMB, standard boiling point: 174° C., phase at 25° C.: liquid, $R_1$=C5; $R_2$=C1; n=1); diethylene glycol monomethyl ether (standard boiling point: 194° C., phase at 25° C.: liquid, $R_1$=C2; $R_2$=C1; n=2); diethylene glycol monoethyl ether (standard boiling point: 202° C., phase at 25° C.: liquid, $R_1$=C2; $R_2$=C2; n=2); or dipropylene glycol monomethyl ether (abbreviation: DPM, standard boiling point: 190° C., phase at 25° C.: liquid, $R_1$=C3; $R_2$=C1; n=2).

Among the alkylene glycol monoethers (B) described above, at least one selected from 3-methoxy-1-butanol, 1-methoxy-2-propanol, 1-ethoxy-2-propanol, 3-methoxy-3-methyl-1-butanol, and dipropylene glycol monomethyl ether is preferable, and 3-methoxy-1-butanol, 3-methoxy-3-methyl butanol, or 1-methoxy-2-propanol is more preferable.

When the alkylene glycol monoether (B) is the compound as described above, the abrasion resistance and the storage stability tend to be made more excellent at the same time.

The standard boiling point of the alkylene glycol monoether (B) is preferably 110° C. to 210° C., more preferably 130° C. to 190° C., and further preferably 140° C. to 180° C.

A content of the alkylene glycol monoether (B) represented by the general formula (1) having a standard boiling point of 210° C. or less with respect to the total mass of the ink composition is preferably 2 to 10 percent by mass. A lower limit of the content described above is more preferably 2.5 percent by mass or more, even more preferably 3.0 percent by mass or more, further preferably 3.5 percent by mass or more, and particularly preferably 4.0 percent by mass or more. An upper limit of the content described above is more preferably 9.0 percent by mass or less, even more preferably 8.0 percent by mass or less, further preferably 7.0 percent by mass or less, even further preferably 6.0 percent by mass or less, and particularly preferably 5.0 percent by mass or less.

When the lower limit of the content of the alkylene glycol monoether (B) is 2 percent by mass or more and more preferably the specific value described above or more, the wet spreadability of the ink to the low-absorbing recording medium or the non-absorbing recording medium is improved, and the image quality (wet spreadability) tends to be made more excellent. In addition, when the upper limit of the content described above is 10 percent by mass or less and more preferably the specific value described above or less, since a preferable drying property can be secured and in addition, since the dispersion stability is not likely to be degraded, the clogging recovery property, the abrasion resistance, and the dispersion stability tend to be made more excellent.

1.3.3. Specific Water-Soluble Low Molecular Weight Organic Compound (2)

In the ink jet ink composition according to this embodiment, the content of the water-soluble low molecular weight organic compound having a standard boiling point of 250° C. or less with respect to the total mass of the ink composition is 8 to 30 percent by mass, and the water-soluble low molecular weight organic compound which is an alkane polyol having a standard boiling point of more than 250° C. is not contained at a content of more than 3 percent by mass with respect to the total mass of the ink composition.

Water-Soluble Low Molecular Weight Organic Compound Having Standard Boiling Point of 250° C. or Less As the water-soluble low molecular weight organic compound having a standard boiling point of 250° C. or less, the alkanediol (A) and the alkylene glycol monoether (B) described above are included, and besides the compounds described above, among the water-soluble low molecular weight organic compounds described above, the compound having a standard boiling point of 250° C. or less may also be included.

For example, there may be mentioned 2-pyrrolidone (abbreviation: 2P, standard boiling point: 245° C., classification: amide, phase at 25° C.: liquid), dimethylsulfoxide (abbreviation: DMSO, standard boiling point: 188° C., classification: sulfur-containing solvent, phase at 25° C.: liquid), 3-ethyl-3-oxetanemethanol (abbreviation: EOXM, standard boiling point: 220° C., classification: cyclic ether, phase at 25° C.: liquid), 1,2-hexanediol (abbreviation: 1,2HD, standard boiling point: 224° C., classification: alkanediol, phase at 25° C.: liquid), or 1,5-pentanediol (abbreviation: 1,5PD, standard boiling point: 239° C., classification: alkanediol, phase at 25° C.: liquid).

A content of the water-soluble low molecular weight organic compound having a standard boiling point of 250° C. or less with respect to the total mass of the ink composition is 8 to 30 percent by mass. A lower limit of the content of the water-soluble low molecular weight organic compound having a standard boiling point of 250° C. or less with respect to the total mass of the ink composition is preferably 10 percent by mass or more, more preferably 12 percent by mass or more, even more preferably 14 percent by mass or more, further preferably 16 percent by mass or more, even further preferably 18 percent by mass or more, and particularly preferably 20 percent by mass or more. In addition, an upper limit of the content of the water-soluble low molecular weight organic compound having a standard boiling point of 250° C. or less with respect to the total mass of the ink composition is preferably 28 percent by mass or less, more preferably 26 percent by mass or less, even more preferably 24 percent by mass or less, and further preferably 22 percent by mass or less.

When the lower limit of the content of the water-soluble low molecular weight organic compound having a standard boiling point of 250° C. or less is 8 percent by mass or more and preferably in the range described above, the image quality (wet spreadability) and the clogging recovery property tend to be made excellent. In addition, when the upper limit of the content of the water-soluble low molecular weight organic compound having a standard boiling point of 250° C. or less is 30 percent by mass or less and preferably in the range described above, a preferable drying property is likely to be secured, and the abrasion resistance tends to be made more excellent.

Alkane Polyol Having Standard Boiling Point of More than 250° C.

In addition, as the water-soluble low molecular weight organic compound which is an alkane polyol having a standard boiling point of more than 250° C., among the alkane polyols described above, the compound having a standard boiling point of more than 250° C. may be mentioned.

For example, there may be mentioned triethylene glycol (standard boiling point: 287° C.), tripropylene glycol (standard boiling point: 271° C.), glycerin (abbreviation: Gly, standard boiling point: 290° C.), trimethylolethane (standard boiling point: 283° C.), trimethylolpropane (standard boiling point: 295° C.), or pentaerythritol (standard boiling point: 261° C.)

The water-soluble low molecular weight organic compound which is an alkane polyol having a standard boiling point of more than 250° C. is not contained with respect to the total mass of the ink composition at a content of more than 3 percent by mass, preferably at a content of more than 2.0 percent by mass, more preferably at a content of more than 1.5 percent by mass, even more preferably at a content of more than 1.0 percent by mass, further preferably at a content of more than 0.5 percent by mass, and even further preferably at a content of more than 0.1 percent by mass and, particularly preferably, may be not contained (0 percent by mass).

Although the water-soluble low molecular weight organic compound which is an alkane polyol having a standard boiling point of more than 250° C. has an excellent moisture retaining property, the drying property thereof is seriously inferior, and as a result, the abrasion resistance is liable to be degraded. On the other hand, according to the ink jet ink composition of this embodiment, even when the water-soluble low molecular weight organic compound which is an alkane polyol having a standard boiling point of more than 250° C. is not contained at a content of more than 3 percent by mass or is contained preferably in the range described above, the clogging recovery property and the abrasion resistance can be made excellent at the same time.

1.3.4. Specific Water-Soluble Low Molecular Weight Organic Compound (3)

In the ink jet ink composition according to this embodiment, as the water-soluble low molecular weight organic compound, in particular, the following may be described by way of example.

Amide, Sulfur-Containing Solvent, and Cyclic Ether

In the ink jet ink composition according to this embodiment, as the water-soluble low molecular weight organic compound, at least one selected from an amide, a sulfur-containing solvent, and a cyclic ether may be contained at a content of 1 to 10 percent by mass with respect to the total mass ink composition.

Among the amide, the sulfur-containing solvent, and the cyclic ether, the amide is more preferably contained as the water-soluble low molecular weight organic compound.

Although a lower limit of a content of the at least one selected from the amide, the sulfur-containing solvent, and the cyclic ether is not particularly limited, the lower limit described above may be 0.50 percent by mass or more, is preferably 1.25 percent by mass or more, even more preferably 1.50 percent by mass or more, and further preferably 1.75 percent by mass or more. In addition, an upper limit of the content of the at least one selected from the amide, the sulfur-containing solvent, and the cyclic ether is preferably 8 percent by mass or less, more preferably 6 percent by mass or less, and further preferably 4 percent by mass or less.

When the content of the at least one selected from the amide, the sulfur-containing solvent, and the cyclic ether with respect to the total mass of the ink composition is 1 to 10 percent by mass and more preferably in the range described above, the abrasion resistance tends to be improved.

Low Molecular Weight Organic Compound Having Standard Boiling Point of More than 250° C. (Except for Alkane Polyol)

In the ink jet ink composition according to this embodiment, as the water-soluble low molecular weight organic compound, a low molecular weight organic compound having a standard boiling point of more than 250° C. except for an alkane polyol may be contained.

As the low molecular weight organic compound having a standard boiling point of more than 250° C. except for an alkane polyol, an amide having a standard boiling point of more than 250° C. is more preferable, and for example, ε-caprolactam (abbreviation: CPL, standard boiling point: 267° C., classification: amide, phase at 25° C.: solid) or succinimide (standard boiling point: 287° C., classification: amide, phase at 25° C.: solid) may be mentioned.

When the low molecular weight organic compound having a standard boiling point of more than 250° C. except for an alkane polyol is contained, a content thereof with respect to the total mass of the ink composition may be 1 to 10 percent by mass. In addition, a lower limit of the content described above is preferably 1.25 percent by mass or more, more preferably 1.50 percent by mass or more, and further preferably 1.75 percent by mass or more. In addition, an upper limit of the content described above is preferably 8 percent by mass or less, more preferably 6 percent by mass or less, and further preferably 4 percent by mass or less.

In addition, in the ink jet ink composition according to this embodiment, the low molecular weight organic compound having a standard boiling point of more than 280° C. is not contained preferably at a content of more than 3 percent by mass, more preferably at a content of more than 2.0 percent by mass, even more preferably at a content of more than 1.5 percent by mass, further preferably at a content of more than 1.0 percent by mass, even further preferably at a content of more than 0.5 percent by mass, and particularly preferably at a content of more than 0.1 percent by mass and, more particularly preferably, may be not contained (0 percent by mass).

1.4. Water

The ink jet ink composition according to this embodiment is a water-based ink jet ink composition and contains water. In addition, the "water-based" in the present disclosure indicates that at least water is used as a primary solvent.

Although the water is not particularly limited, for example, there may be mentioned pure water, such as ion exchange water, ultrafiltration water, reverse osmosis water, or distilled water, or water, such as ultrapure water, in which ionic impurities are removed as much as possible. In addition, in the case in which water sterilized by UV radiation, addition of hydrogen peroxide, or the like is used, generation of fungi and bacteria can be preferably suppressed when the ink composition is stored for a long time. Accordingly, the storage stability tends to be further improved.

A content of the water with respect to the total mass of the ink composition is preferably 40 percent by mass or more, more preferably 45 percent by mass or more, even more preferably 50 percent by mass or more, further preferably 55 percent by mass or more, even further preferably 60 percent by mass or more, and particularly preferably 65 percent by mass or more. In addition, although an upper limit of the content of the water is not particularly limited, the upper limit described above with respect to the total mass of the ink composition is preferably 90 percent by mass or less and more preferably 80 percent by mass or less.

1.5. Surfactant

The ink jet ink composition according to this embodiment may also contain a surfactant. The surfactant has a function to decrease a surface tension of the ink composition and to improve wettability thereof to a recording medium or an under layer. Among the surfactants, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surfactant is not particularly limited, a polysiloxane-based compound is preferably mentioned. Although the polysiloxane-based compound is not particularly limited, for example, a polyether modified organosiloxane may be mentioned. As a commercially available product of the polyether modified organosiloxane, for example, there may be mentioned BYK-306, BYK-307, BYK-333, BYK-341, BYK-345, BYK-346, BYK-348, BYK-349, BYK-3420, BYK-3480, or BYK-3481 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surfactant, for example, a fluorine modified polymer is preferably used, and as a concrete example, BYK-3440 (trade name, manufactured by BYK Japan KK); Surflon S-241, S-242, or S-243 (trade name, manufactured by AGC Seimi Chemical Co., Ltd.); or Ftergent 215M (trade name, manufactured by Neos Co., Ltd.) may be mentioned.

The surfactant may be used alone, or at least two types thereof may be used in combination.

The ink jet ink composition according to this embodiment preferably contains the surfactant at a content of 0.2 to 1.2 percent by mass with respect to the total mass of the ink composition. A lower limit of the content of the surfactant is more preferably 0.3 percent by mass or more, even preferably 0.4 percent by mass or more, and further preferably 0.5 percent by mass or more. In addition, an upper limit of the content of the surfactant is more preferably 1.0 percent by mass or less, even preferably 0.8 percent by mass or less, and further preferably 0.7 percent by mass or less.

When the content of the surfactant is 0.2 to 1.2 percent by mass and more preferably in the range described above, the abrasion resistance, the image quality (wet spreadability), and the clogging recovery property tend to be made excellent with good balance.

In particular, as for the content of the surfactant, the silicone-based surfactant is more preferably contained at a content of 0.1 to 0.8 percent by mass with respect to the total mass of the ink composition, and the acetylene glycol-based surfactant is more preferably contained at a content of 0.1 to 0.4 percent by mass with respect to the total mass of the ink composition.

1.6. Water-Dispersible Resin

The ink jet ink composition according to this embodiment may contain a water-dispersible resin. When the ink composition contains a water-dispersible resin, the abrasion resistance preferably tends to be made more excellent.

As the water-dispersible resin, for example, there may be mentioned an acrylic-based resin, an urethane-based resin, a polyester-based resin, an olefin-based resin, a fluorene-based resin, a rosin-modified resin, a terpene-based resin, a polyamide-based resin, an epoxy-based resin, a vinyl chloride-based resin, or an ethylene-vinyl acetate-based resin. The water-dispersible resin is preferably in the form of an emulsion, that is, is preferably contained in the ink in the form of resin particles.

The acrylic-based resin is a generic name of a polymer obtained by polymerization using at least an acrylic-based monomer, such as (meth)acrylic acid or a (meth)acrylate ester, as one component, and for example, a resin obtained from an acrylic-based monomer or a copolymer between an acrylic-based monomer and a monomer other than that may be mentioned. For example, an acrylic vinyl-based resin which is a copolymer between an acrylic-based monomer and a vinyl-based monomer may be mentioned. Furthermore, for example, a copolymer with a vinyl-based monomer such as styrene may also be mentioned. As the acrylic-based monomer, for example, acrylamide or acrylonitrile may also be used.

As a resin emulsion using an acrylic-based resin as a raw material, a commercially available product may also be selectively used, for example, from FK-854, Movinyl 952B, and 718A (trade name, manufactured by Japan Coating Resin Corporation); Nipol LX852 and LX874 (trade name, manufactured by Zeon Corporation); Polysol AT860 (manufactured by Showa Denko K.K.); and Boncoat AN-1190S, YG-651, AC-501, AN-1170, and 4001 (trade name, acrylic-based resin emulsion, manufactured by DIC Corporation).

In addition, in this specification, the acrylic-based resin may be a styrene-acrylic-based resin as described above. In addition, as described above, in this specification, "(meth)acryl" represents acryl and/or methacryl.

The styrene-acrylic-based resin is a copolymer obtained from a styrene monomer and an acrylic-based monomer, and for example, there may be mentioned a styrene-acrylic acid copolymer, a styrene-methacrylic acid copolymer, a styrene-methacrylic acid-acrylate ester copolymer, a styrene-α-methylstyrene-acrylic acid copolymer, or a styrene-α-methylstyrene-acrylic acid-acrylate ester copolymer. As the styrene-acrylic-based resin, a commercially available product may also be used, and for example, there may be mentioned Joncryl 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); or Movinyl 966A or 975N (trade name, manufactured by Japan Coating Resin Corporation).

The urethane-based resin is a generic name of a resin having an urethane bond. As the urethane-based resin, for example, a polyether type urethane resin having an ether bond in its main chain besides the urethane bond, a polyester type urethane resin having an ester bond in its main chain besides the urethane bond, or a polycarbonate type urethane resin having a carbonate bond in its main chain besides the urethane bond may be used. In addition, as the urethane-based resin, a commercially available product may also be used and may be selected, for example, from Superflex 210, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6020, WS-6021 and W-512-A-6 (trade name, manufactured by Mitsui Chemicals Polyurethanes Inc.); Suncure 2710 (trade name, manufactured by Lubrizol); and Permarin UA-150 (trade name, manufactured by Sanyo Chemical Industries, Ltd.).

Although the polyester-based resin is not particularly limited, for example, a poly(ethylene terephthalate) may be mentioned. As the polyester-based resin, a commercially available product may also be used, and for example, Elitel KT8701 (trade name, manufactured by Unitika Ltd.) may be mentioned.

As the olefin-based resin, for example, a resin manufactured from an olefin, such as ethylene, propylene, or butylene, or its derivative may be mentioned, and in particular, a polyethylene-based resin, a polypropylene-based resin, or a polybutylene-based resin may be mentioned.

As a commercially available product of the olefin-based resin, for example, there may be mentioned AQUACER Series, such as AQUACER513(polyethylene-based resin, average particle diameter: 100 to 200 nm, melting point: 130° C., solid content: 30%), AQUACER507, AQUACER515, AQUACER840, or AQUACER1547(trade name, manufactured by BYK Japan KK); Hitec Series, such as Hitec E-7025P, Hitec E-2213, Hitec E-6500, Hitec E-6314, Hitec E-9460, Hitec E-9015, Hitec E-4A, Hitec E-5403P, or Hitec E-8237(trade name, polyethylene-based resin, manufactured by Toho Chemical Industry Co., Ltd.); or Nopcoat PEM-17(trade name, polyethylene emulsion, average particle diameter: 40 nm, manufactured by San Nopco Ltd.).

The water-dispersible resin may be used alone, or at least two types thereof may be used in combination.

In the ink jet ink composition according to this embodiment, at least one water-dispersible resin selected from the acrylic-based resin, the urethane-based resin, the polyester-based resin, and the olefin-based resin is more preferable, and at least one selected from the acrylic-based resin and the olefin-based resin is further preferable. When the water-dispersible resin is a resin selected from those mentioned above, the abrasion resistance tends to be made particularly excellent.

In addition, since the ink jet ink composition described above is likely to be formed into a film on a recording medium, and the film thus formed has a more excellent abrasion resistance due to its excellent adhesion thereto, a glass transition temperature (Tg) of the water-dispersible resin is preferably 150° C. or less and more preferably 120° C. or less. In addition, since the abrasion resistance is made more excellent due to a certain hardness, and since a blocking resistance (bleed-through resistance) is made more excellent, the glass transition temperature described above is preferably −50° C. or more, more preferably 0° C. or more, and further preferably 20° C. or more. In addition, the glass transition temperature (Tg) can be confirmed by a known method using a differential scanning calorimetry (DSC) or the like.

A content of the water-dispersible resin on a solid content basis with respect to the total mass of the ink composition is preferably 0.1 to 20 percent by mass, more preferably 1.0 to 15.0 percent by mass, further preferably 2.0 to 10.0 percent by mass, and particularly preferably 3.0 to 8.0 percent by mass. When the content of the water-dispersible resin is in the range described above, the abrasion resistance tends to be made more excellent.

1.7. Other Components

As components other than those described above, various types of additives, such as a defoaming agent, a solubilizing agent, a viscosity adjuster, a pH adjuster, an antioxidant, an antiseptic agent, a fungicide, a corrosion inhibitor, and/or a chelating agent to trap metal ions imparting adverse influence on the dispersion, may be appropriately added to the ink jet ink composition according to this embodiment.

1.8. Manufacturing Method

The ink jet ink composition according to this embodiment can be obtained such that for example, the components described above are mixed together in an arbitrary order, and impurities are then removed by filtration of the like, if needed. As a mixing method of each component, a method in which materials are sequentially added to a container equipped with a stirring device, such as a mechanical stirrer or a magnetic stirrer, and are then stirred and mixed together may be preferably used. As a filtration method, for example, centrifugal filtration or filter filtration may be performed, if needed.

1.9. Physical Properties

In consideration of the balance between the image quality and the reliability as an ink jet recording ink, the ink jet ink composition according to this embodiment has a surface tension at 20° C. of preferably 18 to 40 mN/m, more preferably 20 to 35 mN/m, and further preferably 22 to 33 mN/m. Measurement of the surface tension may be performed such that by using an automatic surface tensiometer CBVP-Z (trade name, manufactured by Kyowa Interface Science Co., Ltd.), a surface tension at which a platinum plate is wetted with the ink in an environment at 20° C. is confirmed.

In addition, from the consideration similar to that described above, a viscosity of the ink jet ink composition according to this embodiment at 20° C. is preferably 3 to 10 mPa·s and more preferably 3 to 8 mPa·s. In addition, measurement of the viscosity may be performed such that by using an viscoelastic tester MCR-300 (trade name, manufactured by Pysica) or the like, a viscosity in an environment at 20° C. is measured.

1.10. Application

The ink jet ink composition according to this embodiment is used for recording on a non-absorbing recording medium or a low-absorbing recording medium. In addition, as a recording mode, a recording method which will be described later may be used.

The non-absorbing recording medium or the low-absorbing recording medium indicates a recording medium absorbing no liquid, such as an ink, or a recording medium absorbing almost no liquid, respectively. From a quantitative point of view, the non-absorbing recording medium or the low-absorbing recording medium indicates a recording medium having a water absorbing amount of 10 mL/m2 or less from a contact start to a point of 30 msec$^{1/2}$ by Bristow method. This Bristow method is a most popular measurement method of a liquid absorption amount in a short time and has also been employed by Japan Technical Association of the Pulp and Paper Industry (JAPAN TAPPI).

The details of the test method have been disclosed in Standard No. 51 "Paper and Paperboard-Liquid Absorption Test Method-Bristow Method", JAPAN TAPPI PAPER AND PULP TEST METHODS, 2000. On the other hand, an absorbing recording medium indicates a recording medium corresponding to neither the non-absorbing recording medium nor the low-absorbing recording medium.

As the non-absorbing recording medium, there may be mentioned a medium in which a recording surface contains a plastic and more preferably, a medium in which a recording surface is formed of a plastic. In this case, on the recording surface, neither an absorbing layer to absorb a liquid nor a receiving layer is provided. For example, there may be mentioned a medium in which a plastic is coated on a substrate, such as paper, a medium in which a plastic film is adhered to a substrate, such as paper, or a medium formed from a plastic film having neither an absorbing layer nor a receiving layer. As the plastic described above, for example, there may be mentioned a poly(vinyl chloride), a polyethylene terephthalate), a polycarbonate, a polystyrene, a polyurethane, a polyethylene, or a polypropylene.

In addition, as the low-absorbing recording medium, a recording medium called a coated paper having a surface on which a coating layer is provided may be mentioned. For example, as a low-absorbing recording medium using paper as the substrate, printing paper, such as art paper, coated paper, or mat paper, may be mentioned, and as a low-absorbing recording medium using a plastic film as the substrate, a recording medium in which, for example, a hydrophilic polymer is applied on a surface formed, for example, from a poly(vinyl chloride), a polyethylene terephthalate), a polycarbonate, a polystyrene, a polyurethane, a polyethylene, or a polypropylene or a recording medium in which particles formed of silica, titanium, or the like are applied together with a binder on the surface as described above may be mentioned.

The ink jet ink composition according to this embodiment may be also preferably used for recording on a soft packaging film. The soft packaging film is one type of the non-absorbing recording medium described above. In more particular, the soft packaging film is a film material having a high flexibility to be used, for example, for food packaging and/or packaging of toiletries and cosmetic articles and is a film material which has a film thickness in a range of 5 to 70 μm and preferably 10 to 50 μm and which has a film surface on which a material having an antifogging property and/or antistatic property, an antioxidant, and/or the like is present. When an ink composition is adhered to this film, compared to a plastic film having an ordinary thickness, since the ink composition is more unlikely to be fixed, the abrasion resistance and the image quality (wet spreadability) may be inferior in some cases. However, even when the soft packaging film is used, by the ink jet ink composition according to this embodiment, excellent abrasion resistance and image quality (wet spreadability) tend to be obtained.

As a material forming a recording surface of the soft packaging film, for example, a material containing at least one resin selected from an olefin-based resin, such as a polyethylene or a polypropylene, an ester-based resin, such as a polyester, a vinyl chloride-based resin, such as a poly(vinyl chloride), and an amide-based resin, such as a polyamide, may be used. As a film substrate including the recording surface of the soft packaging film, a film or a sheet obtained by processing at least one of the resins mentioned above may be used. In the case of the film or the sheet formed from the resin, for example, either a non-stretched film or a stretched film stretched in one axial direction or two axial directions may be used, and a film or a sheet stretched in two axial directions is preferably used. In addition, if needed, films or sheets formed from at least one of those various types of resins mentioned above may also be used together after being adhered to each other in a laminated state.

In addition, the ink jet ink composition according to this embodiment may be also preferably used for recording on a sign graphic recording medium. As the sign graphic recording medium, although various types of materials, such as a banner, coated paper, mat paper, wallpaper, a cloth, and a plastic film, such as a PET or a PVC, may be mentioned, in particular, the ink jet ink composition described above is preferably applied to a transparent/translucent plastic film to be used for window display, car lapping, and the like. Many of those films each have a structure in which the substrate is formed, for example, form a flexible polyolefin, PET, or PVC, and an adhesive layer is provide on a surface opposite to the recording surface, and after the printing is performed, those films are each adhered to a window glass, a car body, or the like with this adhesive layer. When an ink is adhered to this film, since the ink is more unlikely to be fixed, the abrasion resistance and the image quality (wet spreadability) tend to be degraded in some cases. However, even when the sign graphic recording medium is used, by the ink jet ink composition according to this embodiment, excellent abrasion resistance and image quality (wet spreadability) tend to be obtained.

As a material forming the recording surface of the sign graphic film, a material containing at least one resin selected from an olefin-based resin, such as a polyethylene or a polypropylene, an ester-based resin, such as a polyester, a vinyl chloride-based resin, such as a poly(vinyl chloride), and an amide-based resin, such as a polyamide, may be used.

In addition, the recording medium may be colorless transparent, translucent, colored transparent, chromatic opaque, colorless opaque, or the like.

2. Recording Method

A recording method according to one embodiment of the present disclosure includes an adhesion step of adhering the ink jet ink composition described above to the non-absorbing recording medium or the low-absorbing recording medium by an ink jet method.

According to the recording method of this embodiment, the above ink jet ink composition which contains the specific alkylene glycol monoether, the specific alkanediol, and the amine in combination is used, and while an excellent image quality (wet spreadability) is obtained, excellent abrasion resistance, clogging recovery property, and storage stability are obtained.

2.1. Ink Adhesion Step

The recording method according to this embodiment includes an adhesion step (ink adhesion step) of adhering the ink jet ink composition described above to the non-absorbing recording medium or the low-absorbing recording medium by an ink jet method.

In addition, the ink jet method is a recording method in which from ejection nozzles of an ink jet head provided in a recording apparatus such as an ink jet printer, fine liquid droplets of an ink jet ink are ejected so as to be adhered to a recording medium or the like.

The ink adhesion step can be easily performed such that, for example, by using an ink jet recording apparatus 1 shown in FIG. 1 which is one embodiment of an ink jet recording apparatus described below, an ink is ejected from an ink jet head 2. In addition, a composition to be ejected from the ink jet head by an ink jet method and to be used for recording is called an ink jet ink composition.

An adhesion amount of the ink jet ink composition per unit area of a recording region of the recording medium is preferably 1 to 40 mg/inch$^2$, more preferably 2 to 30 mg/inch$^2$, even more preferably 4 to 20 mg/inch$^2$, and further preferably 6 to 16 mg/inch$^2$. In the recording, the maximum ink adhesion amount per unit area of the recording region of the recording medium is also preferably set in the range described above.

In addition, in the ink adhesion step of the recording method according to this embodiment, while the ink jet ink composition described above is ejected from the ink jet head, a main scanning in which a relative position between the recording medium and the ink jet head is transferred is preferably performed a plurality of times, and the number of main scannings performed on the same main scanning region is preferably 12 or less. An upper limit of the number of main scannings performed on the same main scanning region is more preferably 11 or less, even more preferably 10 or less, and further more preferably 9 or less. Although a lower limit of the number of main scannings is 1 or more and is not particularly limited, the lower limit described above is preferably 2 or more and more preferably 3 or more.

In the main scanning, a time of one main scanning is preferably 0.5 to 5 seconds, more preferably 1 to 4 seconds, and further preferably 2 to 3 seconds. The time of one main scanning (also called "main scanning time" in some cases) is a time required in one main scanning, to transfer a head location from a position facing one end of the recording medium to a position facing the other end thereof.

The ink adhesion step may be performed on a recording medium having a surface temperature of 45° C. or less when the ink jet ink composition described above is adhered thereto. That is, the ink adhesion step may be performed either with or without heating the recording medium. Even when the heating is performed, the recording medium is preferably heated so as to have a surface temperature of 45° C. or less.

An upper limit of the surface temperature of the recording medium is more preferably 42° C. or less, even more preferably 38° C. or less, and further preferably 32° C. or less, and particularly preferably 28° C. or less. A lower limit of the surface temperature thereof is preferably 20° C. or more, more preferably 23° C. or more, and further preferably 25° C. or more.

2.2. Treatment Liquid Adhesion Step

The recording method according to this embodiment may further include a step (treatment liquid adhesion step) of adhering a treatment liquid containing an aggregating agent to the non-absorbing recording medium or the low-absorbing recording medium.

As a method to adhere the treatment liquid to the recording medium, one of a non-contact method and a contact method, such as an ink jet method, a coating method, a method of applying the treatment liquid to the recording medium using various types of sprays, a method of applying the treatment liquid by immersing the recording medium therein, and a method of applying the treatment liquid to the recording medium by a brush or the like, may be used, or at least two of the methods described above may be used in combination.

The treatment liquid adhesion step may be performed such that for example, by the ink jet recording apparatus 1 as shown in FIG. 1, the treatment liquid may be ejected from the ink jet head 2. Accordingly, the treatment liquid and the ink jet ink composition can be more preferably adhered to the recording medium by one ink jet recording apparatus.

The treatment liquid adhesion step may be performed either before or after the ink composition is adhered and may also be performed at the same time when the ink composition is adhered.

An adhesion amount of the treatment liquid per unit area of the recording region of the recording medium is preferably 0.1 to 5 mg/inch$^2$, more preferably 0.3 to 4 mg/inch$^2$, even more preferably 0.5 to 3 mg/inch$^2$, and further preferably 0.7 to 1.5 mg/inch$^2$. In the recording, the maximum adhesion amount of the treatment liquid per unit area of the recording region of the recording medium is also preferably set in the range described above.

Hereinafter, components contained in the treatment liquid will be described.

Treatment Liquid

The treatment liquid at least contains an aggregating agent, and as the aggregating agent, at least one selected from a polyvalent metal salt, an organic acid, and a cationic resin is contained at a content of 1 to 15 percent by mass with respect to a total mass of the treatment liquid.

When the treatment liquid adhesion step is performed using the treatment liquid as described above, the image quality (wet spreadability) tends to be made more excellent. In addition, even when the surface temperature of the recording medium in the ink adhesion step is relatively low, a preferable image quality (wet spreadability) is likely to be obtained. Hence, while a preferable image quality (wet spreadability) is secured, a thermal influence on the head is reduced, and the clogging recovery property can be made more preferable in some cases.

Aggregating Agent

The treatment liquid which may be used for the recording method according to this embodiment is a treatment liquid containing an aggregating agent. Since acting on the dispersibility of the component, such as the colorant (in particular, the pigment), contained in the ink jet ink composition, the aggregating agent has an action to aggregate a dispersion, such as the colorant. A degree of the aggregation of the dispersion by the aggregating agent is changed dependent on the types of the aggregating agents and objects to be aggregated and can be adjusted. By the aggregating action as described above, for example, a color development property of the image can be enhanced, and/or a fixing property of the image can be enhanced.

Although the aggregating agent is not particularly limited, for example, a metal salt, an acid, or a cationic compound may be mentioned, and as the cationic compound, for example, a cationic resin (cationic polymer) or a cationic surfactant may be used. Among those mentioned above, as the metal salt, a polyvalent metal salt is preferable, and as the cationic compound, a cationic resin is preferable. As the acid, an organic acid or an inorganic acid may be mentioned, and an organic acid is preferable. Accordingly, when the aggregating agent is selected from a polyvalent metal salt, an organic acid, and a cationic resin, an image particularly excellent in image quality, abrasion resistance, glossiness, and the like can be preferably obtained.

Metal Salt

As the metal salt, although a metal salt other than the polyvalent metal salt may also be used, the polyvalent metal salt is preferable. As the metal salt other than the polyvalent metal salt, a monovalent metal salt, such as a sodium salt or a potassium salt, may be mentioned, and for example, sodium sulfate or potassium sulfate may be mentioned. On the other hand, the polyvalent metal salt is a compound formed from at least divalent metal ion and an anion. As the at least divalent metal ion, for example, an ion of calcium, magnesium, copper, nickel, zinc, barium, aluminum, titanium, strontium, chromium, cobalt, iron, or the like may be mentioned. Among the metal ions forming those polyvalent metal salts, since being excellent in aggregation property of the component of the ink, a calcium ion and/or a magnesium ion is preferable.

As the anion forming the polyvalent metal salt, an inorganic ion or an organic ion may be mentioned. That is, the polyvalent metal salt of the present disclosure is a salt formed from a polyvalent metal and an inorganic ion or an organic ion. As the inorganic ion as described above, for example, a chlorine ion, a bromine ion, an iodine ion, a nitrate ion, a sulfate ion, or a hydroxide ion may be mentioned. As the organic ion, an organic acid ion may be mentioned, and for example, a carboxylate ion may be mentioned.

In addition, the polyvalent metal compound is preferably an ionic polyvalent metal salt, and in particular, when the polyvalent metal salt is a magnesium salt or a calcium salt, stability of the treatment liquid is made more preferable. In addition, as a counter ion of the polyvalent metal, either an inorganic acid ion or an organic acid ion may be used.

As a concrete example of the above polyvalent metal salt, for example, a calcium carbonate, such as a heavy calcium carbonate or a light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, or aluminum lactate may be mentioned. Those polyvalent metal salts may be used alone, or at least two types thereof may be used in combination. Among those mentioned above, since a sufficient solubility in water can be obtained, at least one selected from magnesium sulfate, calcium nitrate, aluminum lactate, and calcium propionate is preferable. In addition, those metal salts each may have hydrated water in the form of a raw material.

Acid

As the organic acid, for example, there may be preferably mentioned a poly(meth)acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivative or a salt of one of those acids mentioned above. The organic acids may be used alone, or at least two types thereof may be used in combination. An organic acid salt or an inorganic acid salt which also functions as a metal salt is included in the metal salt described above.

As the inorganic acid, for example, sulfuric acid, hydrochloric acid, nitric acid, or phosphoric acid may be mentioned. The inorganic acids may be used alone, or at least two types thereof may be used in combination.

Cationic Compound

As the cationic resin (cationic polymer), for example, a cationic urethane-based resin, a cationic olefin-based resin, a cationic amine-based resin, or a cationic surfactant may be mentioned.

As the cationic urethane-based resin, a commercially available product may be used, and for example, Hydran CP-7010, CP-7020, CP-7030, CP-7040, CP-7050, CP-7060, or CP-7610 (trade name, manufactured by DIC Corporation); Superflex 600, 610, 620, 630, 640, or 650 (trade name, manufactured by DKS Co., Ltd.); or Urethane Emulsion WBR-2120C or WBR-2122C (trade name, manufactured by Taisei Fine Chemical Co., Ltd.) may be used.

The cationic olefin-based resin is a resin having a structural skeleton of an olefin, such as ethylene or propylene, and a known resin may be appropriately and selectively used. In addition, the cationic olefin-based resin may also be in the form of an emulsion in which the resin is dispersed in a solvent, such as water or an organic solvent. As the cationic olefin-based resin, a commercially available product may be used, and for example, Arrowbase CB-1200 or CD-1200 (trade name, manufactured by Unitika Ltd.) may be mentioned.

As the cationic amine-based resin (cationic polymer), a resin having an amino group in its structure may be used, and a known resin may be appropriately and selectively used. For example, a polyamine resin, a polyamide resin, or a polyallylamine resin may be mentioned. The polyamine resin is a resin having an amino group in its main skeleton. The polyamide resin is a resin having an amide group in its main skeleton. The polyallylamine resin is a resin having a structure derived from an allyl group in its main skeleton.

In addition, as the cationic polyamine-based resin, for example, there may be mentioned Unisence KHE103L manufactured by Senka Corporation (hexamethylenediamine/epichlorohydrin resin, pH of 1%-aqueous solution: approximately 5.0; viscosity: 20 to 50 (mPa·s); aqueous solution at a solid content concentration of 50 percent by mass) or Unisence KHE104L (dimethylamine/epichlorohydrin resin, pH of 1%-aqueous solution: approximately 7.0; viscosity: 1 to 10 (mPa·s); aqueous solution at a solid content concentration of 20 percent by mass). Furthermore, as a concrete example of a commercially available product of the cationic polyamine-based resin, for example, there may be mentioned FL-14 (manufactured by SNF); Arafix 100, 251S, 255, or 255LOX (manufactured by Arakawa Chemical Industries, Ltd.); DK-6810, 6853, or 6885, WS-4010, 4011, 4020, 4024, 4027, or 4030 (manufactured by Seiko PMC Corporation); Papyogene P-105 (manufactured by Senka Corporation); Sumirez Resin 650(30), 675A, 6615, or SLX-1 (manufactured by Taoka Chemical Co., Ltd.); Catiomaster (registered trademark) PD-1, PD-7, PD-30, PD-A, PDT-2, PE-10, PE-30, DT-EH, EPA-SK01, or TMHMDA-E (manufactured by Yokkaichi Chemical Company Limited); or Jetfix 36N, 38A, or 5052 (manufactured by Satoda Chemical Industrial Co., Ltd.).

As the polyallylamine resin, for example, there may be mentioned a polyallylamine hydrochloride, a polyallylamineamide sulfate, an allylamine hydrochloride-diallylamine hydrochloride copolymer, an allylamine acetate-diallylamine acetate copolymer, an allylamine hydrochloride-dimethylallylamine hydrochloride copolymer, an allylamine-dimethylallylamine copolymer, a polydiallylamine hydrochloride, a polymethyldiallylamine hydrochloride, a polymethyldiallylamineamide sulfate, a polymethyldiallylamine acetate, a polydiallyldimethylammonium chloride, a diallylamine acetate-sulfur dioxide copolymer, a diallylmethylethylammoniumethyl sulfate-sulfur dioxide copolymer, a methyldiallylamine hydrochloride-sulfur dioxide copolymer, a diallyldimethylammonium chloride-sulfur dioxide copolymer, or a diallydimethylammonium chloride-acrylamide copolymer.

As the cationic surfactant, for example, there may be mentioned a primary, a secondary, or a tertiary amine salt type compound, an alkylamine salt, a dialkylamine salt, an aliphatic amine salt, a benzalkonium salt, a quaternary ammonium salt, a quaternary alkylammonium salt, an alkylpyridinium salt, a sulfonium salt, a phosphonium salt, an onium salt, or an imidazolinium salt. In particular, for example, there may be mentioned a hydrochloride, an acetate, or the like of laurylamine, palm amine, or rosin amine, lauryltrimethylammonium chloride, cetyltrimethylammonium chloride, benzyltributylammonium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, or octadecyldimethylammonium chloride. In addition, although functioning as the aggregating agent which will be described later, the cationic surfactant may be contained in the ink jet ink composition. However, the cationic surfactant is more preferably contained in the treatment liquid as the aggregating agent.

The aggregating agents described above may be used alone, or at least two types thereof may be used in combination. In addition, the aggregating agent is more preferably at least one selected from the polyvalent metal salt, the organic acid, and the cationic resin.

A total content of the aggregating agents in the treatment liquid with respect to the total mass of the treatment liquid is, for example, 0.1 to 20 percent by mass, preferably 1 to 20 percent by mass and more preferably 2 to 15 percent by mass. In addition, when the aggregating agent is contained in the form of a solution or a dispersion, a content of the solid content thereof is also preferably in the range described above. When the content of the aggregating agent is 1 percent by mass or more, the aggregating agent tends to be able to have a sufficient ability to aggregate the component contained in the ink. In addition, since the content of the aggregating agent is 30 percent by mass or less, solubility and/or dispersibility of the aggregating agent in the treatment liquid is made more preferable, and for example, storage stability of the treatment liquid may be improved in some cases.

In the recording method according to this embodiment, in particular, at least one selected from the polyvalent metal salt, the organic acid, and the cationic resin is preferably contained as the aggregating agent at a content of 1 to 15 percent by mass with respect to the total mass of the treatment liquid. A lower limit of the content of the aggregating agent with respect to the total mass of the treatment liquid is preferably 0.1 percent by mass or more, more preferably 1.0 percent by mass or more, even more preferably 2.0 percent by mass or more, and further preferably 3.0 percent by mass or more. In addition, an upper limit of the content of the aggregating agent is preferably 20.0 percent by mass or less, more preferably 15.0 percent by mass or less, even more preferably 10.0 percent by mass or less, further preferably 7.0 percent by mass or less, and particularly preferably 5.0 percent by mass or less.

When the treatment liquid contains as the aggregating agent, at least one selected from the polyvalent metal salt, the organic acid, and the cationic resin at a content of 1 to 15 percent by mass with respect to the total mass of the treatment liquid or more preferably in the range described above, the image quality (wet spreadability) tends to be made more excellent.

Water-Soluble Low Molecular Weight Organic Compound

The treatment liquid which may be used for the recording method according to this embodiment may contain a water-soluble low molecular weight organic compound. Since the water-soluble low molecular weight organic compound is similar to that described in the above ink jet ink composition, the description thereof will be omitted.

The type and the composition of the water-soluble low molecular weight organic compound may be similar to those of the water-soluble low molecular weight organic compound in the ink jet ink composition described above.

In the treatment liquid described above, as the water-soluble low molecular weight organic compound, a water-soluble low molecular weight organic compound having a standard boiling point of 250° C. or less and a water-soluble low molecular weight organic compound having a standard boiling point of more than 250° C. are more preferably contained. As the water-soluble low molecular weight organic compound having a standard boiling point of 250° C. or less, for example, an alkanediol having a standard boiling point of 250° C. or less is preferable, and propylene glycol (standard boiling point: 188° C.) or 1,2-hexanediol (standard boiling point: 224° C.) is more preferable. In addition, as the water-soluble low molecular weight organic compound having a standard boiling point of more than 250° C., for example, an amide having a standard boiling point of more than 250° C. is preferable, and ε-caprolactam (standard boiling point: 267° C.) is more preferable.

A content of the water-soluble low molecular weight organic compound with respect to the total mass of the treatment liquid is preferably 10 to 30 percent by mass, more preferably 12 to 28 percent by mass, even more preferably 14 to 26 percent by mass, and further preferably 16 to 24 percent by mass.

In particular, the water-soluble low molecular weight organic compound having a standard boiling point of 250° C. or less is contained with respect to the total mass of the treatment liquid at a content of 8 to 27 percent by mass, preferably at a content of 11 to 25 percent by mass, and more preferably at a content of 14 to 23 percent by mass, and the water-soluble low molecular weight organic compound having a standard boiling point of more than 250° C. is contained with respect to the total mass of the treatment liquid at a content of 0.5 to 5 percent by mass, preferably at a content of 1.0 to 4 percent by mass, and more preferably at a content of 1.5 to 3 percent by mass.

Water

The treatment liquid which may be used for the recording method according to this embodiment may contain water, and since the water is similar to that described in the above ink jet ink composition, the description thereof will be omitted.

In the treatment liquid described above, a content of the water with respect to the total mass of the treatment liquid is preferably 40 percent by mass or more, more preferably 45 percent by mass or more, even more preferably 50 percent by mass or more, further preferably 55 percent by mass or more, even further preferably 60 percent by mass or more, and particularly preferably 65 percent by mass or more. In addition, although an upper limit of the content of the water is not particularly limited, the upper limit described above with respect to the total mass of the treatment liquid is preferably 90 percent by mass or less and more preferably 80 percent by mass or less.

Surfactant

The treatment liquid which may be used for the recording method according to this embodiment may contain a surfactant. Since the surfactant is similar to that described in the above ink jet ink composition, the description thereof is omitted.

In the treatment liquid described above, the surfactant is preferably contained at a content of 0.2 to 1.2 percent by mass with respect to the total mass of the treatment liquid. A lower limit of the content of the surfactant is more preferably 0.3 percent by mass or more, further preferably 0.4 percent by mass or more, and particularly preferably 0.5 percent by mass or more. In addition, an upper limit of the content of the surfactant is more preferably 1.0 percent by mass or less, further preferably 0.8 percent by mass or less, and particularly preferably 0.7 percent by mass or less.

Other Components

To the treatment liquid which may be used for the recording method according to this embodiment, various types of additives, such as a defoaming agent, a solubilizing agent, a viscosity adjuster, a pH adjuster, an antioxidant, an antiseptic agent, a fungicide, a corrosion inhibitor, and/or a chelating agent to trap metal ions imparting adverse influence on the dispersion, may be appropriately added.

In addition, it should be noted that the treatment liquid described above can be prepared independently of the components contained in the ink jet ink composition described above and the contents thereof.

2.3. Primary Drying Step

In addition, the recording method according to this embodiment may further include a primary drying step. Since the step as described above is included, at an early stage in which the ink jet ink composition is adhered to the recording medium, the drying property of the ink can be improved, and an excellent image quality is likely to be obtained.

The primary drying step is a step to dry the ink at an early stage in which the ink jet ink composition is adhered to the recording medium. The primary drying step is a drying step to dry at least part of a solvent component of the ink so that the fluidity of the ink adhered to the recording medium is at least decreased.

As a method of the primary drying step, for example, there may be mentioned a method to perform ventilation at ordinary temperature (ordinary temperature wind) or ventilation with heating (hot wind) to a recording medium by a fan or the like; a radiation method using an IR heater or microwaves; a method to heat a recording medium by a platen heater or the like; and a method to be performed in combination of the methods described above. In addition, in the primary drying step according to this embodiment, the method described above is not particularly limited as long as being capable of improving the drying property of the ink, and it should be noted that heating is not always required. Hence, in the primary drying step of this embodiment, the method to perform ventilation at ordinary temperature may be used alone. In addition, the primary drying step is more preferably performed by a method to be performed with heating.

When the ventilation is performed as the primary drying step, a ventilation wind speed is preferably 0.5 to 10 m/s, more preferably 1 to 5 m/s, and further preferably 2 to 3 m/s. The wind speed is a wind speed in the vicinity of the surface of the recording medium. When the wind speed is in the range described above or higher than that, for example, the image quality is preferably made more excellent, and dew condensation on the head is preferably further suppressed. When the wind speed is in the range described above or lower than that, for example, the clogging recovery property is preferably made more excellent. A ventilation wind temperature is preferably 50° C. or less, preferably 10° C. or more, even more preferably 15° C. to 45° C., and further preferably 20° C. to 49° C. The ventilation wind temperature may also be ordinary temperature.

When the primary drying step is performed with heating, the primary drying step may be performed such that the ink is adhered to a heated recording medium or the heating is performed at an early stage after the ink is adhered to the recording medium. In the primary drying step, the heating is preferably started within 0.5 seconds at the latest after ink droplets are landed on the recording medium.

When the primary drying step is performed with heating, the heating may be performed before the ink adhesion step, at the same time as that of the ink adhesion, or at an early stage after the ink adhesion step and is preferably performed at the same time as that of the ink adhesion. By the heating order as described above, the ink adhesion step can be performed.

In addition, when the primary drying step is performed with heating, the heating in this step may be preferably performed in the temperature range described as the surface temperature of the recording medium in the above ink adhesion step. In addition, when the ink is adhered to the heated recording medium, the heating temperature in the primary drying step is the surface temperature of the recording medium when the ink is adhered thereto, and when the heating is performed at an early stage after the ink adhesion, the heating temperature in the primary drying step is the surface temperature of the recording medium when the heating is performed. In addition, the surface temperature described above is the maximum temperature during the heating in the primary drying step.

2.4. Post-Heating Step

The recording method according to this embodiment may further include a post-heating step of heating the recording medium to which the above ink jet ink composition is adhered so that a recording medium surface has a temperature of 60° C. to 120° C. and preferably 80° C. to 110° C. after passing through the platen. Accordingly, the drying property is further improved, and a recorded matter more excellent in abrasion resistance preferably tends to be obtained.

The post-heating step is a step to complete the recording and to sufficiently dry the recorded matter so as to be ready for use. The post-drying step is a drying step to sufficiently dry the solvent component of the ink and to form a film from a coating film of the ink by heating the resin or the like to be contained therein.

After a certain point of the recording medium to which the ink is adhered in the above ink adhesion step passes through the platen, the post-heating step is preferably started on the surface of the recording medium including the certain point described above. For example, in the ink jet recording apparatus 1 shown in FIGS. 1 and 2, after the ink is adhered to a certain point of a recording medium M by the ink jet head 2 facing a platen 11, and the certain point of the recording medium M to which the ink is adhered passes through the platen 11, the post-heating step is started by a heating heater 5 on the surface of the recording medium M including the certain point described above.

In addition, for example, when the ink jet recording apparatus is used, the heating of the recording medium in the post-heating step may be performed using an appropriate heating device. In addition, besides the heating device equipped in the ink jet recording apparatus, the heating may also be performed by an appropriate heating device.

In the post-heating step, a lower limit of the surface temperature of the recording medium is preferably 50° C. or more, more preferably 60° C. or more, even more preferably 70° C. or more, and further preferably 75° C. or more. An upper limit of the surface temperature of the recording medium is preferably 120° C. or less, more preferably 110° C. or less, even more preferably 100° C. or less, and further preferably 90° C. or less.

In addition, a preferable temperature in the primary drying step and a preferable temperature in the post-heating step are preferably different from each other.

2.5. Ink Jet Recording Apparatus

One example of an ink jet recording apparatus which can be used for the recording method according to this embodiment will be described with reference to the drawings.

Figure 2:
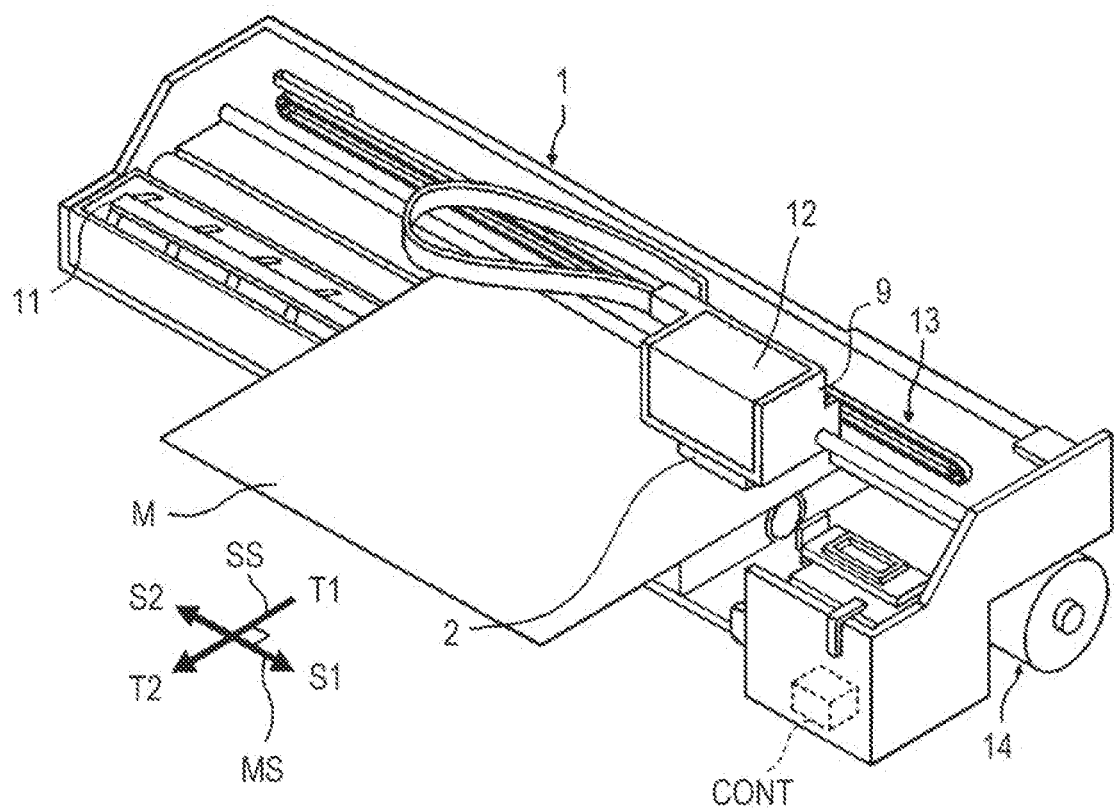
FIG. 2 is a schematic view of a carriage and its periphery of the example of the ink jet recording apparatus.

FIG. 1 is a cross-sectional view schematically showing the ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes the ink jet head 2, an IR heater 3, a platen heater 4, the heating heater 5, a cooling fan 6, a pre-heater 7, a ventilation fan 8, a carriage 9, the platen 11, a carriage transfer mechanism 13, a transport device 14, and a control portion CONT. In the ink jet recording apparatus 1, all operations thereof are controlled by the control portion CONT shown in FIG. 2.

The ink jet head 2 has a structure to perform recording on the recording medium M by ejecting a treatment liquid and an ink jet ink composition from nozzles of the ink jet head 2 so as to be adhered thereto. In this embodiment, the ink jet head 2 is a serial type ink jet head and is configured to adhere the ink to the recording medium M by a plurality of scannings performed in a main scanning direction relative to the recording medium M. The ink jet head 2 is mounted on the carriage 9 shown in FIG. 2. The ink jet head 2 is scanned a plurality of times in the main scanning direction relative to the recording medium M by the operation of the carriage transfer mechanism 13 to transfer the carriage 9 in a medium width direction of the recording medium M. The medium width direction is the main scanning direction of the ink jet head 2. The scanning in the main scanning direction is also called a main scanning.

In addition, the main scanning direction is a direction in which the carriage 9 mounting the ink jet head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is a main scanning direction MS, and a direction represented by T1→T2 is a sub-scanning direction SS. In addition, by one scanning, the scanning is performed in the main scanning direction, that is, in one direction represented by an arrow S1 or an arrow S2. In addition, since the main scanning of the ink jet head 2 and the sub-scanning which is the transport of the recording medium M are repeatedly performed at least two times, the ink is recorded on the recording medium M. That is, the treatment liquid adhesion step and the ink adhesion step are performed by a plurality of main scannings in each of which the ink jet head 2 is transferred in the main scanning direction and by a plurality of sub-scannings in each of which the recording medium M is transported in the sub-scanning direction intersecting the main scanning direction.

The cartridge 12 to supply the ink jet ink composition and the treatment liquid to the ink jet head 2 includes a plurality of independent cartridges. The cartridge 12 is detachably fitted to the carriage 9 mounting the ink jet head 2. In the respective cartridges, different types of ink jet ink compositions and the treatment liquid are filled, and the ink jet ink compositions and the treatment liquid are supplied to respective nozzles from the cartridge 12. In addition, in this embodiment, although the case in which the cartridge 12 is fitted to the carriage 9 is shown by way of example, the cartridge 12 is not limited thereto and may be provided at a position other than that of the carriage 9 so that the ink jet ink compositions and the treatment liquid are each supplied to the nozzle by a supply tube not shown.

For the ejection by the ink jet head 2, a known method may be used. In this embodiment, a method to eject a liquid droplet using vibration of a piezoelectric element, that is, an ejection method to form an ink droplet by a mechanical deformation of an electrostrictive element, is used.

The ink jet recording apparatus 1 includes the ventilation fan 8, the IR heater 3, and the platen heater 4 each of which is used to dry the ink jet ink composition ejected from the ink jet head 2 and adhered to the recording medium M. By appropriately using the ventilation fan 8, the IR heater 3, and the platen heater 4 in combination, the primary drying step can be performed. Furthermore, in the primary drying step, the recording medium M is not always required to be heated, and for example, the ventilation fan 8 may only be used to perform ventilation at ordinary temperature.

In addition, when the IR heater 3 is used, the recording medium M can be heated using a radiation method to radiate infrared rays from an ink jet head 2 side. Accordingly, although the ink jet head 2 is also liable to be simultaneously heated, compared to the case in which heating is performed from a rear surface of the recording medium M by the platen heater 4 or the like, the temperature can be increased without receiving the influence of the thickness of the recording medium M. In addition, there may be also provided various types of fans (such as the ventilation fan 8) to dry the ink on the recording medium M by supplying a hot wind or a wind having the same temperature as that in the environment to the recording medium M.

In order to perform drying at an early stage after the treatment liquid or the ink jet ink composition ejected from the ink jet head 2 is adhered to the recording medium M, the platen heater 4 is configured to be able to heat the recording medium M at a position facing the ink jet head 2 with the platen 11 interposed therebetween. The platen heater 4 is able to heat the recording medium M by a conduction method, and in the recording method of this embodiment, the ink jet ink composition can be adhered to the recording medium M thus heated as described above. Hence, the ink jet ink composition can be fixed on the recording medium M at an early stage, and the image quality can be improved.

The heating heater 5 dries and solidifies the treatment liquid or the ink jet ink composition adhered to the recording medium M, that is, the heating heater 5 is a secondary heating heater or a secondary drying heater. The heating heater 5 can be used in the post-drying step. Since the heating heater 5 heats the recording medium M on which an image is recorded, for example, moisture contained in the ink jet ink composition is more rapidly evaporated and scattered, and an ink film is formed by the resin to be contained in the ink jet ink composition. As described above, the ink film is tightly fixed or adhered onto the recording medium M so as to have an excellent film forming property, and hence, an image having an excellent high image quality can be obtained in a short time.

The ink jet recording apparatus 1 may also include the cooling fan 6. After the ink jet ink composition recorded on the recording medium M is dried, when the ink jet ink composition on the recording medium M is cooled by the cooling fan 6, an ink coating film can be formed so as to have an excellent adhesion onto the recording medium M.

In addition, the ink jet recording apparatus 1 may also include the pre-heater 7 to heat the recording medium M in advance before the ink jet ink composition is adhered to the recording medium M. Furthermore, the ink jet recording apparatus 1 may also include the ventilation fan 8 so as to more efficiently dry the ink jet ink composition adhered to the recording medium M.

At a lower side of the carriage 9, there are provided the platen 11 to support the recording medium M, the carriage transfer mechanism 13 to transfer the carriage 9 relative to the recording medium M, and the transport device 14 which is a roller to transport the recording medium M in the sub-scanning direction. The operations of the carriage transfer mechanism 13 and the transport device 14 are controlled by the control portion CONT.

In FIGS. 1 and 2, although the serial type ink jet recording apparatus is shown, a line type ink jet recording apparatus may also be used.

The ink jet recording apparatus described above by way of example can be preferably used to perform the recording method according to this embodiment.

3. Examples

Hereinafter, although the present disclosure will be more particularly described with reference to Examples, the present disclosure is not limited thereto. Hereinafter, is on mass basis unless otherwise specifically noted.

3.1. Preparation of Ink Jet Ink Composition

After components were charged into a container to have one of the compositions shown in the following Tables 1 to 3 and were then mixed and stirred together for 2 hours using a magnetic stirrer, filtration was performed using a membrane filter having a pore diameter of 5 μm, so that ink jet ink compositions of Examples and Comparative Examples were obtained. The numerical values in the following Tables 1 to 3 each represent percent by mass, and pure water was added so that a total mass of the ink jet ink composition was 100 percent by mass. In addition, a pigment dispersion liquid prepared as described below in advance was used. In addition, the numerical values of the pigment dispersion liquid and the water-dispersible resin in the tables each represent an effective component amount (solid content basis).

Preparation of Pigment Dispersion Liquid

In a flask equipped with a dripping funnel, a nitrogen inlet tube, a reflux condenser, a thermometer, and a stirring device, 50 g of methyl ethyl ketone (MEK) was charged, and while nitrogen bubbling was performed, the temperature was increased to 75° C. In addition, a mixture containing monomers, that is, 80 g of butyl methacrylate, 50 g of methyl methacrylate, 15 g of styrene, and 20 g of methacrylic acid; 50 g of MEK, and 500 mg of a polymerization initiator (azoisobutyronitrile/AIBN) was dripped into the flask described above over 3 hours.

After the dripping was finished, heating reflux was further performed for 6 hours, and MEK in an amount corresponding to that lost by evaporation was added after spontaneous cooling, so that a resin solution (resin solid content: 50 percent by mass, acid value: 79 mg/KOH, Tg: 65° C.) was obtained. After a predetermined amount of a sodium hydroxide aqueous solution at a concentration of 20 percent by mass was added as a neutralizer to 20 g of the above resin solution to neutralize 100% of a salt forming group, 50 g of a pigment (C.I. Pigment Blue 15: 3) was gradually added with stirring to the neutralized solution and was then kneaded for 2 hours by a bead mill.

After 200 g of ion exchange water was added to the kneaded product thus obtained and then stirred, MEK was distilled off by heating in a reduced-pressure atmosphere. Furthermore, the concentration was adjusted by ion exchange water, so that a pigment dispersion liquid (pigment solid content: 20 percent by mass, resin solid content: 5 percent by weight) was obtained.

3.2. Preparation of Treatment Liquid

After components were charged into a container to have one of the compositions shown in the following Table 4 and were then mixed and stirred together for 2 hours using a magnetic stirrer, filtration was performed using a membrane filter having a pore diameter of 5 μm, so that treatment liquids of Examples were obtained. The numerical values in the following Table 4 each represent percent by mass, and pure water was added so that a total mass of the treatment liquid was 100 percent by mass. In addition, the numerical value of the cationic resin in the table represents an effective component amount (solid content basis).

TABLE 1

| | | | INK A | INK B | INK C | INK D |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 16 | 20 | 24 | 12 |
| | | 1,3BG (BOILING POINT: 207° C.) | | | | |
| | ALKYLENE GLYCOL MONOETHER (B) (BOILING POINT: 210° C. OR LESS) | MB (BOILING POINT: 158° C.) | 4 | 5 | 6 | 3 |
| | | PM (BOILING POINT: 120° C.) | | | | |
| | | PE (BOILING POINT: 132° C.) | | | | |
| | | MMB (BOILING POINT: 174° C.) | | | | |
| | | DPM (BOILING POINT: 190° C.) | | | | |
| | AMIDE | 2P (BOILING POINT: 245° C.) | | | | |
| | SULFUR-CONTAINING SOLVENT | DMSO (BOILING POINT: 188° C.) | | | | |
| | CYCLIC ETHER | EOXM (BOILING POINT: 220° C.) | | | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | | | |
| | AMIDE | CPL (BOILING POINT: 267° C.) | 2 | 2 | 2 | 2 |
| AMINE | ALKANOLAMINE (BOILING POINT: 270° C. OR MORE) | TIPA (BOILING POINT: 301° C.) | 2 | 2 | 2 | 2 |
| | | TEA (BOILING POINT: 335° C.) | | | | |
| | | tBDEA (BOILING POINT: 271° C.) | | | | |
| | ALKANOLAMINE (BOILING POINT: LESS THAN 270° C.) | MDEA (BOILING POINT: 245° C.) | | | | |
| | | AMP (BOILING POINT: 165° C.) | | | | |
| | NON-ALKANOLAMINE | APM (BOILING POINT: 225° C.) | | | | |
| SURFACTANT | SILICONE BASE | BYK-349 | 0.4 | 0.4 | 0.4 | 0.4 |
| | ACETYLENE BASE | SURFYNOL DF110D | 0.2 | 0.2 | 0.2 | 0.2 |
| PIGMENT DISPERSION LIQUID | | CYAN PIGMENT (EFFECTIVE COMPONENT) | 4 | 4 | 4 | 4 |
| WATER-DISPERSIBLE RESIN | | JONCRYL 631 (EFFECTIVE COMPONENT) | 6 | 6 | 6 | 6 |
| | | HITECH E-6500 (EFFECTIVE COMPONENT) | 0.5 | 0.5 | 0.5 | 0.5 |
| PURE WATER | | | BALANCE | BALANCE | BALANCE | BALANCE |
| TOTAL | | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21 | 26 | 31 | 16 |
| RATIO B/A | | | 0.25 | 0.25 | 0.25 | 0.25 |
| TOTAL OF AMIDE, SULFUR-CONTAINING SOLVENT, AND CYCLIC ETHER | | | 2 | 2 | 2 | 2 |
| TOTAL OF SURFACTANT | | | 0.6 | 0.6 | 0.6 | 0.6 |
| EVALUATION | | STORAGE STABILITY | A | A | A | A |

| | | | INK E | INK F | INK G | INK H |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 4 | 12 | 10 | 20 |
| | | 1,3BG (BOILING POINT: 207° C.) | | | | |
| | ALKYLENE GLYCOL MONOETHER (B) (BOILING POINT: 210° C. OR LESS) | MB (BOILING POINT: 158° C.) | 1 | 8 | 10 | |
| | | PM (BOILING POINT: 120° C.) | | | | |
| | | PE (BOILING POINT: 132° C.) | | | | |
| | | MMB (BOILING POINT: 174° C.) | | | | |
| | | DPM (BOILING POINT: 190° C.) | | | | |
| | AMIDE | 2P (BOILING POINT: 245° C.) | | | | |
| | SULFUR-CONTAINING SOLVENT | DMSO (BOILING POINT: 188° C.) | | | | |
| | CYCLIC ETHER | EOXM (BOILING POINT: 220° C.) | | | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | | | |
| | AMIDE | CPL (BOILING POINT: 267° C.) | 2 | 2 | 2 | 2 |
| AMINE | ALKANOLAMINE (BOILING POINT: 270° C. OR MORE) | TIPA (BOILING POINT: 301° C.) | 2 | 2 | 2 | 2 |
| | | TEA (BOILING POINT: 335° C.) | | | | |
| | | tBDEA (BOILING POINT: 271° C.) | | | | |

TABLE 1-continued

| | | | | | | |
|---|---|---|---|---|---|---|
| | ALKANOLAMINE (BOILING POINT: LESS THAN 270° C.) | MDEA (BOILING POINT: 245° C.) AMP (BOILING POINT: 165° C.) | | | | |
| | NON-ALKANOLAMINE | APM (BOILING POINT: 225° C.) | | | | |
| SURFACTANT | SILICONE BASE | BYK-349 | 0.4 | 0.4 | 0.4 | 0.4 |
| | ACETYLENE BASE | SURFYNOL DF110D | 0.2 | 0.2 | 0.2 | 0.2 |
| PIGMENT DISPERSION LIQUID | | CYAN PIGMENT (EFFECTIVE COMPONENT) | 4 | 4 | 4 | 4 |
| WATER-DISPERSIBLE RESIN | | JONCRYL 631 (EFFECTIVE COMPONENT) | 6 | 6 | 6 | 6 |
| | | HITECH E-6500 (EFFECTIVE COMPONENT) | 0.5 | 0.5 | 0.5 | 0.5 |
| PURE WATER | | | BALANCE | BALANCE | BALANCE | BALANCE |
| TOTAL | | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 6 | 21 | 21 | 21 |
| RATIO B/A | | | 0.25 | 0.67 | 1.00 | — |
| TOTAL OF AMIDE, SULFUR-CONTAINING SOLVENT, AND CYCLIC ETHER | | | 2 | 2 | 2 | 2 |
| TOTAL OF SURFACTANT | | | 0.6 | 0.6 | 0.6 | 0.6 |
| EVALUATION | | STORAGE STABILITY | A | B | C | A |

| | | | INK I | INK J | INK K | INK L |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | | 16 | 16 | 16 |
| | | 1,3BG (BOILING POINT: 207° C.) | | | | |
| | ALKYLENE GLYCOL MONOETHER (B) (BOILING POINT: 210° C. OR LESS) | MB (BOILING POINT: 158° C.) | 20 | 4 | 4 | 4 |
| | | PM (BOILING POINT: 120° C.) | | | | |
| | | PE (BOILING POINT: 132° C.) | | | | |
| | | MMB (BOILING POINT: 174° C.) | | | | |
| | | DPM (BOILING POINT: 190° C.) | | | | |
| | AMIDE | 2P (BOILING POINT: 245° C.) | | | | |
| | SULFUR-CONTAINING SOLVENT | DMSO (BOILING POINT: 188° C.) | | | | |
| | CYCLIC ETHER | EOXM (BOILING POINT: 220° C.) | | | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | 4 | | |
| | AMIDE | CPL (BOILING POINT: 267° C.) | 2 | 2 | 2 | 2 |
| AMINE | ALKANOLAMINE (BOILING POINT: 270° C. OR MORE) | TIPA (BOILING POINT: 301° C.) | 2 | 2 | 4 | 6 |
| | | TEA (BOILING POINT: 335° C.) | | | | |
| | | tBDEA (BOILING POINT: 271° C.) | | | | |
| | ALKANOLAMINE (BOILING POINT: LESS THAN 270° C.) | MDEA (BOILING POINT: 245° C.) | | | | |
| | | AMP (BOILING POINT: 165° C.) | | | | |
| | NON-ALKANOLAMINE | APM (BOILING POINT: 225° C.) | | | | |
| SURFACTANT | SILICONE BASE | BYK-349 | 0.4 | 0.4 | 0.4 | 0.4 |
| | ACETYLENE BASE | SURFYNOL DF110D | 0.2 | 0.2 | 0.2 | 0.2 |
| PIGMENT DISPERSION LIQUID | | CYAN PIGMENT (EFFECTIVE COMPONENT) | 4 | 4 | 4 | 4 |
| WATER-DISPERSIBLE RESIN | | JONCRYL 631 (EFFECTIVE COMPONENT) | 6 | 6 | 6 | 6 |
| | | HITECH E-6500 (EFFECTIVE COMPONENT) | 0.5 | 0.5 | 0.5 | 0.5 |
| PURE WATER | | | BALANCE | BALANCE | BALANCE | BALANCE |
| TOTAL | | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21 | 21 | 21 | 21 |
| RATIO B/A | | | — | 0.25 | 0.25 | 0.25 |
| TOTAL OF AMIDE, SULFUR-CONTAINING SOLVENT, AND CYCLIC ETHER | | | 2 | 2 | 2 | 2 |
| TOTAL OF SURFACTANT | | | 0.6 | 0.6 | 0.6 | 0.6 |
| EVALUATION | | STORAGE STABILITY | C | A | A | A |

TABLE 2

| | | | INK M | INK N | INK O | INK P |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 16 | 16 | 14 | |
| | | 1,3BG (BOILING POINT: 207° C.) | | | | 16 |
| | ALKYLENE GLYCOL MONOETHER (B) (BOILING POINT: 210° C. OR LESS) | MB (BOILING POINT: 158° C.) | 4 | 4 | 4 | 4 |
| | | PM (BOILING POINT: 120° C.) | | | | |
| | | PE (BOILING POINT: 132° C.) | | | | |
| | | MMB (BOILING POINT: 174° C.) | | | | |
| | | DPM (BOILING POINT: 190° C.) | | | | |
| | AMIDE | 2P (BOILING POINT: 245° C.) | | | | |
| | SULFUR-CONTAINING SOLVENT | DMSO (BOILING POINT: 188° C.) | | | | |
| | CYCLIC ETHER | EOXM (BOILING POINT: 220° C.) | | | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | 2 | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | | | |
| | AMIDE | CPL (BOILING POINT: 267° C.) | 2 | 2 | 2 | 2 |
| AMINE | ALKANOLAMINE (BOILING POINT: 270° C. OR MORE) | TIPA (BOILING POINT: 301° C.) | 0.5 | | 0.5 | 2 |
| | | TEA (BOILING POINT: 335° C.) | | | | |
| | | tBDEA (BOILING POINT: 271° C.) | | | | |
| | ALKANOLAMINE (BOILING POINT: LESS THAN 270° C.) | MDEA (BOILING POINT: 245° C.) | | | | |
| | | AMP (BOILING POINT: 165° C.) | | | | |
| | NON-ALKANOLAMINE | APM (BOILING POINT: 225° C.) | | | | |
| SURFACTANT | SILICONE BASE | BYK-349 | 0.4 | 0.4 | 0.4 | 0.4 |
| | ACETYLENE BASE | SURFYNOL DF110D | 0.2 | 0.2 | 0.2 | 0.2 |
| PIGMENT DISPERSION LIQUID | | CYAN PIGMENT (EFFECTIVE COMPONENT) | 4 | 4 | 4 | 4 |
| WATER-DISPERSIBLE RESIN | | JONCRYL 631 (EFFECTIVE COMPONENT) | 6 | 6 | 6 | 6 |
| | | HITECH E-6500 (EFFECTIVE COMPONENT) | 0.5 | 0.5 | 0.5 | 0.5 |
| PURE WATER | | | BALANCE | BALANCE | BALANCE | BALANCE |
| TOTAL | | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21 | 21 | 21 | 21 |
| RATIO B/A | | | 0.25 | 0.25 | 0.29 | 0.25 |
| TOTAL OF AMIDE, SULFUR-CONTAINING SOLVENT, AND CYCLIC ETHER | | | 2 | 2 | 2 | 2 |
| TOTAL OF SURFACTANT | | | 0.6 | 0.6 | 0.6 | 0.6 |
| EVALUATION | | STORAGE STABILITY | A | B | A | A |

| | | | INK Q | INK R | INK S | INK T |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 16 | 16 | 16 | 16 |
| | | 1,3BG (BOILING POINT: 207° C.) | | | | |
| | ALKYLENE GLYCOL MONOETHER (B) (BOILING POINT: 210° C. OR LESS) | MB (BOILING POINT: 158° C.) | | | | |
| | | PM (BOILING POINT: 120° C.) | 4 | | | |
| | | PE (BOILING POINT: 132° C.) | | 4 | | |
| | | MMB (BOILING POINT: 174° C.) | | | 4 | |
| | | DPM (BOILING POINT: 190° C.) | | | | 4 |
| | AMIDE | 2P (BOILING POINT: 245° C.) | | | | |
| | SULFUR-CONTAINING SOLVENT | DMSO (BOILING POINT: 188° C.) | | | | |
| | CYCLIC ETHER | EOXM (BOILING POINT: 220° C.) | | | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | | | |
| | AMIDE | CPL (BOILING POINT: 267° C.) | 2 | 2 | 2 | 2 |
| AMINE | ALKANOLAMINE (BOILING POINT: 270° C. OR MORE) | TIPA (BOILING POINT: 301° C.) | 2 | 2 | 2 | 2 |
| | | TEA (BOILING POINT: 335° C.) | | | | |
| | | tBDEA (BOILING POINT: 271° C.) | | | | |

TABLE 2-continued

|  |  |  |  |  |  |  |
|---|---|---|---|---|---|---|
|  | ALKANOLAMINE (BOILING POINT: LESS THAN 270° C.) | MDEA (BOILING POINT: 245° C.) |  |  |  |  |
|  |  | AMP (BOILING POINT: 165° C.) |  |  |  |  |
|  | NON-ALKANOLAMINE | APM (BOILING POINT: 225° C.) |  |  |  |  |
| SURFACTANT | SILICONE BASE | BYK-349 | 0.4 | 0.4 | 0.4 | 0.4 |
|  | ACETYLENE BASE | SURFYNOL DF110D | 0.2 | 0.2 | 0.2 | 0.2 |
| PIGMENT DISPERSION LIQUID |  | CYAN PIGMENT (EFFECTIVE COMPONENT) | 4 | 4 | 4 | 4 |
| WATER-DISPERSIBLE RESIN |  | JONCRYL 631 (EFFECTIVE COMPONENT) | 6 | 6 | 6 | 6 |
|  |  | HITECH E-6500 (EFFECTIVE COMPONENT) | 0.5 | 0.5 | 0.5 | 0.5 |
| PURE WATER |  |  | BALANCE | BALANCE | BALANCE | BALANCE |
| TOTAL |  |  | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS |  |  | 21 | 21 | 21 | 21 |
| RATIO B/A |  |  | 0.25 | 0.25 | 0.25 | 0.25 |
| TOTAL OF AMIDE, SULFUR-CONTAINING SOLVENT, AND CYCLIC ETHER |  |  | 2 | 2 | 2 | 2 |
| TOTAL OF SURFACTANT |  |  | 0.6 | 0.6 | 0.6 | 0.6 |
| EVALUATION |  | STORAGE STABILITY | A | B | B | B |

|  |  |  | INK U | INK V | INK W | INK X |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 16 | 16 | 16 | 16 |
|  |  | 1,3BG (BOILING POINT: 207° C.) |  |  |  |  |
|  | ALKYLENE GLYCOL MONOETHER (B) (BOILING POINT: 210° C. OR LESS) | MB (BOILING POINT: 158° C.) | 4 | 4 | 4 | 4 |
|  |  | PM (BOILING POINT: 120° C.) |  |  |  |  |
|  |  | PE (BOILING POINT: 132° C.) |  |  |  |  |
|  |  | MMB (BOILING POINT: 174° C.) |  |  |  |  |
|  |  | DPM (BOILING POINT: 190° C.) |  |  |  |  |
|  | AMIDE | 2P (BOILING POINT: 245° C.) |  |  |  |  |
|  | SULFUR-CONTAINING SOLVENT | DMSO (BOILING POINT: 188° C.) |  |  |  |  |
|  | CYCLIC ETHER | EOXM (BOILING POINT: 220° C.) |  |  |  |  |
|  | ALKANEDIOL (BOILING POINT: 210° C. TO 250° C.) | 1,2HD (BOILING POINT: 224° C.) | 1 | 1 | 1 | 1 |
|  |  | 1,5PD (BOILING POINT: 239° C.) |  |  |  |  |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) |  |  |  |  |
|  | AMIDE | CPL (BOILING POINT: 267° C.) | 2 | 2 | 2 | 2 |
| AMINE | ALKANOLAMINE (BOILING POINT: 270° C. OR MORE) | TIPA (BOILING POINT: 301° C.) |  |  |  |  |
|  |  | TEA (BOILING POINT: 335° C.) | 2 |  |  |  |
|  |  | tBDEA (BOILING POINT: 271° C.) |  | 2 |  |  |
|  | ALKANOLAMINE (BOILING POINT: LESS THAN 270° C.) | MDEA (BOILING POINT: 245° C.) |  |  | 2 |  |
|  |  | AMP (BOILING POINT: 165° C.) |  |  |  | 2 |
|  | NON-ALKANOLAMINE | APM (BOILING POINT: 225° C.) |  |  |  |  |
| SURFACTANT | SILICONE BASE | BYK-349 | 0.4 | 0.4 | 0.4 | 0.4 |
|  | ACETYLENE BASE | SURFYNOL DF110D | 0.2 | 0.2 | 0.2 | 0.2 |
| PIGMENT DISPERSION LIQUID |  | CYAN PIGMENT (EFFECTIVE COMPONENT) | 4 | 4 | 4 | 4 |
| WATER-DISPERSIBLE RESIN |  | JONCRYL 631 (EFFECTIVE COMPONENT) | 6 | 6 | 6 | 6 |
|  |  | HITECH E-6500 (EFFECTIVE COMPONENT) | 0.5 | 0.5 | 0.5 | 0.5 |
| PURE WATER |  |  | BALANCE | BALANCE | BALANCE | BALANCE |
| TOTAL |  |  | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS |  |  | 21 | 21 | 21 | 21 |
| RATIO B/A |  |  | 0.25 | 0.25 | 0.25 | 0.25 |
| TOTAL OF AMIDE, SULFUR-CONTAINING SOLVENT, AND CYCLIC ETHER |  |  | 2 | 2 | 2 | 2 |
| TOTAL OF SURFACTANT |  |  | 0.6 | 0.6 | 0.6 | 0.6 |
| EVALUATION |  | STORAGE STABILITY | A | A | A | A |

TABLE 3

| | | | INK Y | INK Z | INK AA | INK AB |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 16 | 16 | 16 | 16 |
| | | 1,3BG (BOILING POINT: 207° C.) | | | | |
| | ALKYLENE GLYCOL MONOETHER (B) (BOILING POINT: 210° C. OR LESS) | MB (BOILING POINT: 158° C.) | 4 | 4 | 4 | 4 |
| | | PM (BOILING POINT: 120° C.) | | | | |
| | | PE (BOILING POINT: 132° C.) | | | | |
| | | MMB (BOILING POINT: 174° C.) | | | | |
| | | DPM (BOILING POINT: 190° C.) | | | | |
| | AMIDE | 2P (BOILING POINT: 245° C.) | | | | 2 |
| | SULFUR-CONTAINING SOLVENT | DMSO (BOILING POINT: 188° C.) | | | | |
| | CYCLIC ETHER | EOXM (BOILING POINT: 220° C.) | | | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | | | |
| | AMIDE | CPL (BOILING POINT: 267° C.) | 2 | | 8 | |
| AMINE | ALKANOLAMINE (BOILING POINT: 270° C. OR MORE) | TIPA (BOILING POINT: 301° C.) | | 2 | 2 | 2 |
| | | TEA (BOILING POINT: 335° C.) | | | | |
| | | tBDEA (BOILING POINT: 271° C.) | | | | |
| | ALKANOLAMINE (BOILING POINT: LESS THAN 270° C.) | MDEA (BOILING POINT: 245° C.) | | | | |
| | | AMP (BOILING POINT: 165° C.) | | | | |
| | NON-ALKANOLAMINE | APM (BOILING POINT: 225° C.) | 2 | | | |
| SURFACTANT | SILICONE BASE | BYK-349 | 0.4 | 0.4 | 0.4 | 0.4 |
| | ACETYLENE BASE | SURFYNOL DF110D | 0.2 | 0.2 | 0.2 | 0.2 |
| PIGMENT DISPERSION LIQUID | | CYAN PIGMENT (EFFECTIVE COMPONENT) | 4 | 4 | 4 | 4 |
| WATER-DISPERSIBLE RESIN | | JONCRYL 631 (EFFECTIVE COMPONENT) | 6 | 6 | 6 | 6 |
| | | HITECH E-6500 (EFFECTIVE COMPONENT) | 0.5 | 0.5 | 0.5 | 0.5 |
| PURE WATER | | | BALANCE | BALANCE | BALANCE | BALANCE |
| TOTAL | | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21 | 21 | 21 | 23 |
| RATIO B/A | | | 0.25 | 0.25 | 0.25 | 0.25 |
| TOTAL OF AMIDE, SULFUR-CONTAINING SOLVENT, AND CYCLIC ETHER | | | 2 | 0 | 8 | 2 |
| TOTAL OF SURFACTANT | | | 0.6 | 0.6 | 0.6 | 0.6 |
| EVALUATION | | STORAGE STABILITY | B | A | A | A |

| | | | INK AC | INK AD | INK AE | INK AF |
|---|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 16 | 16 | 16 | 16 |
| | | 1,3BG (BOILING POINT: 207° C.) | | | | |
| | ALKYLENE GLYCOL MONOETHER (B) (BOILING POINT: 210° C. OR LESS) | MB (BOILING POINT: 158° C.) | 4 | 4 | 4 | 4 |
| | | PM (BOILING POINT: 120° C.) | | | | |
| | | PE (BOILING POINT: 132° C.) | | | | |
| | | MMB (BOILING POINT: 174° C.) | | | | |
| | | DPM (BOILING POINT: 190° C.) | | | | |
| | AMIDE | 2P (BOILING POINT: 245° C.) | | | | |
| | SULFUR-CONTAINING SOLVENT | DMSO (BOILING POINT: 188° C.) | 2 | | | |
| | CYCLIC ETHER | EOXM (BOILING POINT: 220° C.) | | 2 | | |
| | ALKANEDIOL (BOILING POINT: 210° C. TO 250° C.) | 1,2HD (BOILING POINT: 224° C.) | 1 | 1 | 1 | 1 |
| | | 1,5PD (BOILING POINT: 239° C.) | | | | |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) | | | | |
| | AMIDE | CPL (BOILING POINT: 267° C.) | | | | |
| AMINE | ALKANOLAMINE (BOILING POINT: 270° C. OR MORE) | TIPA (BOILING POINT: 301° C.) | 2 | 2 | 2 | 2 |
| | | TEA (BOILING POINT: 335° C.) | | | | |
| | | tBDEA (BOILING POINT: 271° C.) | | | | |

TABLE 3-continued

|  |  |  |  |  |  |  |
|---|---|---|---|---|---|---|
|  | ALKANOLAMINE (BOILING POINT: LESS THAN 270° C.) | MDEA (BOILING POINT: 245° C.) AMP (BOILING POINT: 165° C.) |  |  |  |  |
|  | NON-ALKANOLAMINE | APM (BOILING POINT: 225° C.) |  |  |  |  |
| SURFACTANT | SILICONE BASE | BYK-349 | 0.4 | 0.4 | 0.1 | 0.8 |
|  | ACETYLENE BASE | SURFYNOL DF110D | 0.2 | 0.2 | 0.2 | 0.2 |
| PIGMENT DISPERSION LIQUID |  | CYAN PIGMENT (EFFECTIVE COMPONENT) | 4 | 4 | 4 | 4 |
| WATER-DISPERSIBLE RESIN |  | JONCRYL 631 (EFFECTIVE COMPONENT) | 6 | 6 | 6 | 6 |
|  |  | HITECH E-6500 (EFFECTIVE COMPONENT) | 0.5 | 0.5 | 0.5 | 0.5 |
| PURE WATER |  |  | BALANCE | BALANCE | BALANCE | BALANCE |
| TOTAL |  |  | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS |  |  | 23 | 23 | 21 | 21 |
| RATIO B/A |  |  | 0.25 | 0.25 | 0.25 | 0.25 |
| TOTAL OF AMIDE, SULFUR-CONTAINING SOLVENT, AND CYCLIC ETHER |  |  | 2 | 2 | 0 | 0 |
| TOTAL OF SURFACTANT |  |  | 0.6 | 0.6 | 0.3 | 1 |
| EVALUATION |  | STORAGE STABILITY | B | B | A | A |

|  |  |  | INK AG | INK AH | INK AI |
|---|---|---|---|---|---|
| WATER-SOLUBLE LOW MOLECULAR WEIGHT ORGANIC COMPOUND (BOILING POINT: 250° C. OR LESS) | ALKANEDIOL (A) (BOILING POINT: 210° C. OR LESS) | PG (BOILING POINT: 188° C.) | 10 |  | 10 |
|  |  | 1,3BG (BOILING POINT: 207° C.) |  |  | 6 |
|  | ALKYLENE GLYCOL MONOETHER (B) (BOILING POINT: 210° C. OR LESS) | MB (BOILING POINT: 158° C.) | 1 | 8 | 4 |
|  |  | PM (BOILING POINT: 120° C.) |  |  |  |
|  |  | PE (BOILING POINT: 132° C.) |  |  |  |
|  |  | MMB (BOILING POINT: 174° C.) |  |  |  |
|  |  | DPM (BOILING POINT: 190° C.) |  |  |  |
|  | AMIDE | 2P (BOILING POINT: 245° C.) |  |  |  |
|  | SULFUR-CONTAINING SOLVENT | DMSO (BOILING POINT: 188° C.) |  |  |  |
|  | CYCLIC ETHER | EOXM (BOILING POINT: 220° C.) |  |  |  |
|  | ALKANEDIOL (BOILING POINT: 210° C. TO 250° C.) | 1,2HD (BOILING POINT: 224° C.) | 1 | 1 | 1 |
|  |  | 1,5PD (BOILING POINT: 239° C.) |  |  |  |
| WATER-SOLUBLE LOW MOLECULAR WEIGHT ORGANIC COMPOUND (BOILING POINT: MORE THAN 250° C.) | ALKANE POLYOL | Gly (BOILING POINT: 290° C.) |  |  |  |
|  | AMIDE | CPL (BOILING POINT: 267° C.) | 2 | 2 | 2 |
| AMINE | ALKANOLAMINE (BOILING POINT: 270° C. OR MORE) | TIPA (BOILING POINT: 301° C.) | 2 | 2 | 2 |
|  |  | TEA (BOILING POINT: 335° C.) |  |  |  |
|  |  | tBDEA (BOILING POINT: 271° C.) |  |  |  |
|  | ALKANOLAMINE (BOILING POINT: LESS THAN 270° C.) | MDEA (BOILING POINT: 245° C.) |  |  |  |
|  |  | AMP (BOILING POINT: 165° C.) |  |  |  |
|  | NON-ALKANOLAMINE | APM (BOILING POINT: 225° C.) |  |  |  |
| SURFACTANT | SILICONE BASE | BYK-349 | 0.4 | 0.4 | 0.4 |
|  | ACETYLENE BASE | SURFYNOL DF110D | 0.2 | 0.2 | 0.2 |
| PIGMENT DISPERSION LIQUID |  | CYAN PIGMENT (EFFECTIVE COMPONENT) | 4 | 4 | 4 |
| WATER-DISPERSIBLE RESIN |  | JONCRYL 631 (EFFECTIVE COMPONENT) | 6 | 6 | 6 |
|  |  | HITECH E-6500 (EFFECTIVE COMPONENT) | 0.5 | 0.5 | 0.5 |
| PURE WATER |  |  | BALANCE | BALANCE | BALANCE |
| TOTAL |  |  | 100 | 100 | 100 |
| TOTAL OF WATER-SOLUBLE LOW MOLECULAR WEIGHT ORGANIC COMPOUND HAVING STANDARD BOILING POINT OF 250° C. OR LESS |  |  | 12 | 9 | 21 |
| RATIO B/A |  |  | 0.10 | — | 0.25 |
| TOTAL OF AMIDE, SULFUR-CONTAINING SOLVENT, AND CYCLIC ETHER |  |  | 2 | 2 | 2 |
| TOTAL OF SURFACTANT |  |  | 0.6 | 0.6 | 0.6 |
| EVALUATION |  | STORAGE STABILITY | A | C | A |

TABLE 4

|  |  |  | TREATMENT LIQUID A | TREATMENT LIQUID B | TREATMENT LIQUID C |
|---|---|---|---|---|---|
| WATER-SOLUBLE LOW MOLECULAR WEIGHT ORGANIC COMPOUND (BOILING POINT: 250° C. OR LESS) | ALKANEDIOL | PG (BOILING POINT: 188° C.) | 20 | 15 | 15 |
|  |  | 1,2HD (BOILING POINT: 224° C.) | 1 | 1 | 1 |
| WATER-SOLUBLE LOW MOLECULAR WEIGHT ORGANIC COMPOUND (BOILING POINT: MORE THAN 250° C.) | AMIDE | CPL (BOILING POINT: 267° C.) | 2 | 2 | 2 |
| AGGREGATING AGENT | DICARBOXYLIC ACID (ORGANIC ACID) | SUCCINIC ACID | 0.1 | 0.1 | 4 |
|  | POLYVALENT METAL SALT | CALCIUM FORMATE | 4 |  |  |
|  | CATIONIC RESIN | CATIONMASTER PD-7 (EFFECTIVE COMPONENT) |  | 3 |  |
| SURFACTANT | SILICONE BASE | BYK-349 | 0.4 | 0.4 | 0.4 |
|  | ACETYLENE BASE | SURFYNOL DF110D | 0.2 | 0.2 | 0.2 |
|  |  | PURE WATER | BALANCE | BALANCE | BALANCE |
|  |  | TOTAL | 100 | 100 | 100 |

The contents of the above Tables 1 to 4 will be additionally further described.

Technical Term

"Boiling point" indicating a standard boiling point.

"Ratio B/A" indicating a mass ratio (B/A) of an alkylene glycol monoether (B) represented by general formula (1) having a standard boiling point of 210° C. or less to an alkanediol (A) having a standard boiling point of 210° C. or less.

Component

—Water-Soluble Low Molecular Weight Organic Compound—

"PG": propylene glycol, liquid (phase at 25° C.)
"1,3BG": 1,3-butylene glycol, liquid (phase at 25° C.)
"MB": 3-methoxy-1-butanol, liquid (phase at 25° C.)
"PM": 1-methoxy-2-propanol, liquid (phase at 25° C.)
"PE": 1-ethoxy-2-propanol, liquid (phase at 25° C.)
"MMB": 3-methoxy-3-methyl-1-butanol, liquid (phase at 25° C.)
"DPM": dipropylene glycol monomethyl ether, liquid (phase at 25° C.)
"2P": 2-pyrrolidone, liquid (phase at 25° C.)
"DMSO": dimethylsulfoxide, liquid (phase at 25° C.)
"EOXM": 3-ethyl-3-oxetanemethanol, liquid (phase at 25° C.)
"1,2HD": 1,2-hexanediol, liquid (phase at 25° C.)
"1,5PD": 1,5-pentanediol, liquid (phase at 25° C.)
"Gly": glycerin, liquid (phase at 25° C.)
"CPL": ε-caprolactam, solid (phase at 25° C.)

—Amine—

"TIPA": triisopropanolamine, solid (phase at 25° C.)
"TEA": triethanolamine, liquid (phase at 25° C.)
"tBDEA": N-tert-butyldiethanolamine, solid (phase at 25° C.)
"MDEA": N-methyldiethanolamine, liquid (phase at 25° C.)
"AMP": 2-amino-2-methyl-1-propanol, liquid (phase at 25° C.)
"APM": N-(3-aminopropyl)morpholine, cyclic amine, liquid (phase at 25° C.)

—Surfactant—

"BYK-349": trade name, silicone-based surfactant, manufactured by BYK Japan KK "Surfynol DF110D": trade name, acetylene-based surfactant, manufactured by Nisshin Chemical Industry Co., Ltd.

—Colorant—

"Cyan Pigment": C.I. Pigment Blue 15: 3

—Water Dispersible Resin—

"Joncryl 631": trade name, styrene-acrylic-based resin, manufactured by BASF Japan Ltd.
"Hitech E-6500": trade name, polyethylene-based wax emulsion, manufactured by Toho Chemical Industry Co., Ltd.

—Aggregating Agent—

"Cationmaster PD-7": trade name, amine/epichlorohydrin-based cationic resin, manufactured by Yokkaichi Chemical Company Limited 3.3. Recording Conditions Recording conditions in an evaluation test were set as described below.

Recording Conditions

Printer: "SC-R5050", trade name, modified machine, manufactured by Seiko Epson Corporation
Resolution: 1,200×1,200 dpi
Printing pattern: solid pattern (cyan)
Number of scannings: 9 times
Paper face temperature (platen heating temperature): value shown in the following Table 5.
Post-drying temperature: 70° C., post-heating was performed by a post-drying heater provided downstream in a recording medium transport direction.

Recording medium: "Orajet 3165G-010", trade name, vinyl chloride film, manufactured by Orafol Japan Ltd.

Platen gap: 1.7 mm

The recording conditions described above will be additionally further described.

The paper face temperature indicates a surface temperature of the recording medium in a primary drying step. In addition, as a primary drying device, a platen heater was used. Furthermore, ventilation was performed in the vicinity of the surface of the recording medium by a fan provided at an upper side of an ink jet head. A wind temperature was set to 25° C.

The number of scannings is the number of main scannings performed on the same main scanning region.

The treatment liquid and the ink solution were filled in the ink jet head of the recording apparatus described above. The ink solution and the treatment liquid were ejected on the same main scanning region by the same main scanning. As described above, the recording was performed under the recording conditions described above.

TABLE 5

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|
| COLOR INK | INK A | INK B | INK D | INK F | INK K | INK M | INK O | INK P | INK Q | INK R | INK S |
| TREATMENT LIQUID | — | — | — | — | — | — | — | — | — | — | — |
| PAPER FACE TEMPERATURE | 45° C. | 45° C. | 45° C. | 45° C. | 45° C. | 45° C. | 45° C. | 45° C. | 45° C. | 45° C. | 45° C. |
| ABRASION RESISTANCE | A | B | AA | A | B | AA | B | B | A | A | B |
| IMAGE QUALITY (WET SPREADABILITY) | A | A | B | AA | A | A | A | A | A | A | A |
| CLOGGING RECOVERY PROPERTY | A | AA | B | B | AA | B | AA | AA | A | A | A |
| STORAGE STABILITY OF USED INK | A | A | A | B | A | A | A | A | A | B | B |

| | EXAMPLE 12 | EXAMPLE 13 | EXAMPLE 14 | EXAMPLE 15 | EXAMPLE 16 | EXAMPLE 17 | EXAMPLE 18 | EXAMPLE 19 | EXAMPLE 20 | EXAMPLE 21 |
|---|---|---|---|---|---|---|---|---|---|---|
| COLOR INK | INK T | INK U | INK V | INK W | INK X | INK Y | INK Z | INK AA | INK AB | INK AC |
| TREATMENT LIQUID | — | — | — | — | — | — | — | — | — | — |
| PAPER FACE TEMPERATURE | 45° C. | 45° C. | 45° C. | 45° C. | 45° C. | 45° C. | 45° C. | 45° C. | 45° C. | 45° C. |
| ABRASION RESISTANCE | B | A | A | A | AA | A | B | B | A | B |
| IMAGE QUALITY (WET SPREADABILITY) | A | A | A | A | A | A | A | A | A | A |
| CLOGGING RECOVERY PROPERTY | A | A | A | B | B | B | AA | B | A | B |
| STORAGE STABILITY OF USED INK | B | A | A | A | A | B | A | A | A | B |

| | EXAMPLE 22 | EXAMPLE 23 | EXAMPLE 24 | EXAMPLE 25 | EXAMPLE 26 | EXAMPLE 27 | EXAMPLE 28 | EXAMPLE 29 |
|---|---|---|---|---|---|---|---|---|
| COLOR INK | INK AD | INK AE | INK AF | INK AI | INK A | INK A | INK A | INK A |
| TREATMENT LIQUID | — | — | — | — | TREATMENT LIQUID A | TREATMENT LIQUID A | TREATMENT LIQUID B | TREATMENT LIQUID C |
| PAPER FACE TEMPERATURE | 45° C. | 45° C. | 45° C. | 45° C. | 45° C. | 30° C. | 30° C. | 30° C. |
| ABRASION RESISTANCE | B | AA | B | A | B | B | B | B |
| IMAGE QUALITY (WET SPREADABILITY) | A | B | AA | A | AA | A | A | B |
| CLOGGING RECOVERY PROPERTY | B | A | A | AA | A | AA | AA | AA |
| STORAGE STABILITY OF USED INK | B | A | A | A | A | A | A | A |

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| COLOR INK | INK C | INK E | INK G | INK H | INK I |
| TREATMENT LIQUID | — | — | — | — | — |
| PAPER FACE TEMPERATURE | 45° C. | 45° C. | 45° C. | 45° C. | 45° C. |
| ABRASION RESISTANCE | C | AA | AA | B | A |
| IMAGE QUALITY (WET SPREADABILITY) | A | C | AA | C | AA |
| CLOGGING RECOVERY PROPERTY | AA | C | B | AA | C |
| STORAGE STABILITY OF USED INK | A | A | C | A | C |

| | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|
| COLOR INK | INK J | INK L | INK N | INK AG | INK AH |
| TREATMENT LIQUID | — | — | — | — | — |
| PAPER FACE TEMPERATURE | 45° C. | 45° C. | 45° C. | 45° C. | 45° C. |
| ABRASION RESISTANCE | C | C | AA | AA | AA |
| IMAGE QUALITY (WET SPREADABILITY) | A | A | A | C | AA |

TABLE 5-continued

| CLOGGING RECOVERY PROPERTY | AA | AA | C | C | C |
| STORAGE STABILITY OF USED INK | A | A | B | A | C |

3.4. Evaluation Method

In each of Examples and Comparative Examples, evaluation tests of the abrasion resistance, the image quality (wet spreadability), the clogging recovery property, and the storage stability were performed. Hereinafter, the evaluation methods will be described.

3.4.1. Abrasion Resistance

Under the recording conditions described above and in accordance with the contents shown in Table 5, a solid pattern (color ink adhesion amount: 12 mg/inch$^2$, treatment liquid adhesion amount: 1 mg/inch$^2$) was printed on the recording medium and was then left for 30 minutes at room temperature. Subsequently, an ink adhesion portion was cut into a rectangular shape of 30×150 mm and was then rubbed 100 times with a plain-woven cloth using a Gakushin-type fastness rubbing tester (load: 500 g), and a peeling degree of the ink was evaluated by visual inspection. The evaluation criteria were as shown below.

Evaluation Criteria
- AA: No peeling is observed.
- A: Less than 20% of evaluation area is peeled off.
- B: Less than 50% of evaluation area is peeled off.
- C: 50% or more of evaluation area is peeled off.

3.4.2. Image Quality (Wet Spreadability)

Under the recording conditions described above and in accordance with the contents shown in Table 5, a solid pattern (patch pattern in duty increments of 10% when a color ink adhesion amount of 20 mg/inch$^2$ was assumed as a duty of 100%, and a treatment liquid adhesion amount was set to 10 percent by mass of that of the color ink adhesion amount) was printed, and a printed matter thus obtained was then observed by visual inspection. The evaluation criteria were as shown below.

Evaluation Criteria
- AA: No stripe-shaped density irregularity (banding irregularity) extended in main scanning direction is observed.
- A: Although banding irregularity is slightly observed, density difference is small and inconspicuous.
- B: Banding irregularity is observed, and density difference is significant but acceptable.
- C: Banding irregularity is observed, and density difference is significant and conspicuous.

3.4.3. Clogging Recovery Property

Under the recording conditions described above and in accordance with the contents shown in Table 5, a recording apparatus was prepared. After the color ink was filled in "SC-R5050", nozzle missing was intentionally generated by patting a nozzle surface with a Bemcot cloth wetted with water. Under the conditions described above, idle running was performed for 3 hours under the paper face temperature condition shown in Table 5. After the recording was performed, cleaning was performed 3 times, and the number of non-recovered nozzles was counted. By one cleaning, one gram of the ink was ejected from a nozzle group. The nozzle group was formed from 800 nozzles (the treatment liquid was excluded from the evaluation). The evaluation criteria were as shown below.

Evaluation Criteria
- AA: No-ejection nozzles are not observed.
- A: No-ejection nozzles are less than 1%.
- B: No-ejection nozzles are 1% to less than 3%.
- C: No-ejection nozzles are 3% or more.

3.4.4. Storage Stability

After 30 g of the color ink of each of Examples and Comparative Examples was sealed in an aluminum pack so as not to incorporate air bubbles, this aluminum pack was left in a temperature-constant bath at 60° C. for 6 days. After the aluminum pack was recovered from the bath and then spontaneously cooled, a viscosity of the color ink was measured at a shear rate of 200 sec$^{-1}$ using a rheometer (MCR702, manufactured by Anton Paar) and was then compared with a viscosity thereof at an initial stage (immediately after the ink preparation), so that a viscosity increase rate was calculated. The evaluation criteria were as shown below.

Evaluation Criteria
- A: viscosity increase rate is less than 3%.
- B: viscosity increase rate is 3% to less than 5%.
- C: viscosity increase rate is 5% or more.

3.5. Evaluation Results

The evaluation results are shown in Table 5.

From Table 5, it was found that the image quality (wet spreadability), the abrasion resistance, the clogging recovery property, and the storage stability are excellent in all Examples in each of which the water-based ink jet ink composition includes the colorant, the amine, and the water-soluble low molecular weight organic compound and is used for recording on a non-absorbing recording medium or a low-absorbing recording medium, the water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9, a content of a water-soluble low molecular weight organic compound having a standard boiling point of 250° C. or less is 8 to 30 percent by mass with respect to the total mass of the ink composition, a water-soluble low molecular weight organic compound which is an alkane polyol having a standard boiling point of more than 250° C. is not contained at a content of more than 3 percent by mass with respect to the total mass of the ink composition, and a content of the amine with respect to the total mass of the ink composition is 5 percent by mass or less.

As apparent from comparison of Examples 1 to 3 with Comparative Examples 1 to 2, when the content of the water-soluble low molecular weight organic compound having a standard boiling point of 250° C. or less is in a predetermined range, the abrasion resistance, the image quality (wet spreadability), and the clogging recovery property are excellent.

As apparent from comparison of Examples 1 and 4 with Comparative Example 3, when the mass ratio (B/A) is a predetermined value or less, the storage stability is excellent.

In addition, as apparent from comparison of Example 1 with Comparative Example 9, when the mass ratio (B/A) is a predetermined value or more, the image quality (wet spreadability) and the clogging recovery property are excellent.

As apparent from comparison of Examples 1 and 9 to 12 with Comparative Example 4, when the alkylene glycol monoether (B) represented by the general formula (1) having a standard boiling point of 210° C. or less is contained, the image quality (wet spreadability) is excellent.

As apparent from comparison of Examples 1 and 8 with Comparative Examples 5 and 10, when the alkanediol (A) having a standard boiling point of 210° C. or less is contained, the clogging recovery property and the storage stability are excellent.

As apparent from comparison of Example 1 with Comparative Example 6, when the water-soluble low molecular weight organic compound which is an alkane polyol having a standard boiling point of more than 250° C. is not contained in more than a specific amount, the abrasion resistance is excellent.

As apparent from comparison of Examples 1 and 5 to 6 with Comparative Example 7, when the content of the amine is a predetermined value or less, the abrasion resistance is excellent.

As apparent from comparison of Examples 1 and 13 to 17 with Comparative Example 8, when the amine is contained, the clogging recovery property is excellent.

As apparent from the results of Examples 1 to 4, when the content of the alkylene glycol monoether (B) represented by the general formula (1) having a standard boiling point of 210° C. or less is a predetermined value or more, the wet spreadability of the ink to the low-absorbing recording medium or the non-absorbing recording medium is improved, and the image quality (wet spreadability) tends to be made more excellent. In addition, when the content described above is a predetermined value or less, while a preferable drying property is secured, the dispersion stability is not likely to be degraded, and hence, the clogging recovery property, the abrasion resistance, and the dispersion stability tend to be made more excellent.

As apparent from the results of Examples 1 and 9 to 12, by various compounds of the alkylene glycol monoether (B) represented by the general formula (1) having a standard boiling point of 210° C. or less, the image quality (wet spreadability), the abrasion resistance, the clogging recovery property, and the storage stability are excellent.

As apparent from the results of Examples 1 and 13 to 14 and Examples 15 to 17, when the amine is an alkanolamine having a standard boiling point of 270° C. or more, the moisture retaining property is made more excellent, and in addition, a preferable drying property tends to be secured, so that the clogging recovery property and the abrasion resistance tend to be made more preferable with good balance.

As apparent from the results of Examples 1 to 4, when the content of the alkanediol (A) having a standard boiling point of 210° C. or less is a predetermined value or more, the moisture retaining property is made more excellent, and the clogging recovery property tends to be more likely to be improved. In addition, the dispersion stability tends to be not likely to be degraded, and the storage stability is more likely to be made more preferable. Furthermore, when the content of the alkanediol (A) is a predetermined value or less, since the drying property is likely to be secured, the abrasion resistance tends to be made more excellent.

As apparent from the results of Examples 1, 18, and 20 to 22, as the water-soluble low molecular weight organic compound, when at least one selected from the amide, the sulfur-containing solvent, and the cyclic ether is contained in a specific range, the abrasion resistance tends to be improved.

As apparent from the results of Examples 18 and 23 to 24, when the surfactant is contained in a predetermined range, the abrasion resistance, the image quality (wet spreadability), and the clogging recovery property tend to be made more excellent with good balance.

In addition, although not shown in the table, when recording was performed on regular paper (neither the non-absorbing recording medium nor the low-absorbing recording medium) using the ink H in a manner similar to that of Comparative Example 4, since the ink was absorbed and spread in the recording medium, the wet spreadability was excellent; however, the abrasion resistance of the recorded matter was inferior. From the result thus obtained, it was found that when the recording is performed on the non-absorbing recording medium or the low-absorbing recording medium, the wet spreadability is a problem.

From the embodiments described above, the following conclusions are obtained.

A water-based ink jet ink composition according to an aspect of the present disclosure includes: a colorant; an amine; and a water-soluble low molecular weight organic compound and is used for recording on a non-absorbing recording medium or a low-absorbing recording medium, and in the ink jet ink composition described above, the water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9, a content of a water-soluble low molecular weight organic compound having a standard boiling point of 250° C. or less is 8 to 30 percent by mass with respect to a total mass of the ink composition, a water-soluble low molecular weight organic compound which is an alkane polyol having a standard boiling point of more than 250° C. is not contained at a content of more than 3 percent by mass with respect to the total mass of the ink composition, and a content of the amine with respect to the total mass of the ink composition is 5 percent by mass or less.

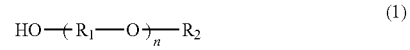

(1)

In the general formula (1), $R_1$ represents an alkylene group having 2 to 5 carbon atoms, $R_2$ represents an alkyl group having 1 or 2 carbon atoms, and n represents 1 or 2.

In the ink jet ink composition according to the aspect described above, a content of the alkylene glycol monoether (B) with respect to the total mass of the ink composition may be 2 to 10 percent by mass.

In the ink jet ink composition according to the aspect described above, the alkylene glycol monoether (B) may be at least one selected from 3-methoxy-1-butanol, 1-methoxy-2-propanol, 1-ethoxy-2-propanol, 3-methoxy-3-methyl-1-butanol, and dipropylene glycol monomethyl ether.

In the ink jet ink composition according to the aspect described above, the amine may be an alkanolamine having a standard boiling point of 270° C. or more.

In the ink jet ink composition according to the aspect described above, a content of the alkanediol (A) having a standard boiling point of 210° C. or less with respect to the total mass of the ink composition may be 10 to 25 percent by mass.

In the ink jet ink composition according to the aspect described above, the water-soluble low molecular weight organic compound may include at least one selected from an amide, a sulfur-containing solvent, and a cyclic ether at a content of 1 to 10 percent by mass with respect to the total mass of the ink composition.

In the ink jet ink composition according to the aspect described above, a surfactant may be further included at a content of 0.2 to 1.2 percent by mass with respect to the total mass of the ink composition.

In the ink jet ink composition according to the aspect described above, a water-dispersible resin selected from an acrylic-based, an urethane-based, a polyester-based, and an olefin-based resin may be further included.

A recording method according to another aspect of the present disclosure includes an adhesion step of adhering one of the ink jet ink compositions described above to the non-absorbing recording medium or the low-absorbing recording medium by an ink jet method.

In the recording method according to the above aspect described above, a step of adhering a treatment liquid containing an aggregating agent to the non-absorbing recording medium or the low-absorbing recording medium may be further included, and the aggregating agent may include at least one selected from a polyvalent metal salt, an organic acid, and a cationic resin at a content of 1 to 15 percent by mass with respect to a total mass of the treatment liquid.

The present disclosure is not limited to the embodiments described above and may be variously changed and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A water-based ink jet ink composition which comprises: a colorant; an amine; and a water-soluble low molecular weight organic compound and which is used for recording on a non-absorbing recording medium or a low-absorbing recording medium,
   wherein the water-soluble low molecular weight organic compound contains an alkylene glycol monoether (B) represented by general formula (1) having a standard boiling point of 210° C. or less and an alkanediol (A) having a standard boiling point of 210° C. or less at a mass ratio (B/A) of 0.2 to 0.9,
   a content of a water-soluble low molecular weight organic compound having a standard boiling point of 250° C. or less is 8 to 30 percent by mass with respect to a total mass of the ink composition,
   a water-soluble low molecular weight organic compound which is an alkane polyol having a standard boiling point of more than 250° C. is not contained at a content of more than 3 percent by mass with respect to the total mass of the ink composition, and
   a content of the amine with respect to the total mass of the ink composition is 5 percent by mass or less,

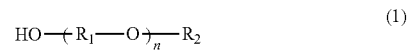

where in the general formula (1), $R_1$ represents an alkylene group having 2 to 5 carbon atoms, $R_2$ represents an alkyl group having 1 or 2 carbon atoms, and n represents 1 or 2.

2. The ink jet ink composition according to claim 1, wherein a content of the alkylene glycol monoether (B) with respect to the total mass of the ink composition is 2 to 10 percent by mass.

3. The ink jet ink composition according to claim 1, wherein the alkylene glycol monoether (B) is at least one selected from 3-methoxy-1-butanol, 1-methoxy-2-propanol, 1-ethoxy-2-propanol, 3-methoxy-3-methyl-1-butanol, and dipropylene glycol monomethyl ether.

4. The ink jet ink composition according to claim 1, wherein the amine is an alkanolamine having a standard boiling point of 270° C. or more.

5. The ink jet ink composition according to claim 1, wherein a content of the alkanediol (A) having a standard boiling point of 210° C. or less with respect to the total mass of the ink composition is 10 to 25 percent by mass.

6. The ink jet ink composition according to claim 1, wherein the water-soluble low molecular weight organic compound includes at least one selected from an amide, a sulfur-containing solvent, and a cyclic ether at a content of 1 to 10 percent by mass with respect to the total mass of the ink composition.

7. The ink jet ink composition according to claim 1, further comprising a surfactant,
   wherein a content of the surfactant with respect to the total mass of the ink composition is 0.2 to 1.2 percent by mass.

8. The ink jet ink composition according to claim 1, further comprising:
   a water-dispersible resin selected from an acrylic-based, an urethane-based, a polyester-based, and an olefin-based resin.

9. A recording method comprising:
   an adhesion step of adhering the ink jet ink composition according to claim 1 to the non-absorbing recording medium or the low-absorbing recording medium by an ink jet method.

10. The recording method according to claim 9, further comprising:
    adhering a treatment liquid containing an aggregating agent to the low-absorbing recording medium or the non-absorbing recording medium,
    wherein the aggregating agent includes at least one selected from a polyvalent metal salt, an organic acid, and a cationic resin at a content of 1 to 15 percent by mass with respect to a total mass of the treatment liquid.

* * * * *